(12) United States Patent
Yamamura et al.

(10) Patent No.: US 8,007,176 B2
(45) Date of Patent: Aug. 30, 2011

(54) DYNAMIC PRESSURE BEARING AND ROTATION MACHINE EMPLOYING SAME

(75) Inventors: Akira Yamamura, Tokyo (JP); Heiichi Unozawa, Nosaka-machi (JP)

(73) Assignee: Ferrotec Corporation, Tokyo (JP)

( * ) Notice: Subject to any disclaimer, the term of this patent is extended or adjusted under 35 U.S.C. 154(b) by 1597 days.

(21) Appl. No.: 10/558,601

(22) PCT Filed: Jun. 24, 2004

(86) PCT No.: PCT/JP2004/008885
§ 371 (c)(1),
(2), (4) Date: Nov. 28, 2005

(87) PCT Pub. No.: WO2005/001300
PCT Pub. Date: Jan. 6, 2005

(65) Prior Publication Data
US 2006/0273673 A1     Dec. 7, 2006

(30) Foreign Application Priority Data
Jun. 27, 2003   (JP) ................................. 2003-185075

(51) Int. Cl.
*F16C 17/10* (2006.01)
*F16C 33/10* (2006.01)
(52) U.S. Cl. .................. 384/107; 384/112; 384/133
(58) Field of Classification Search .................. 384/107, 384/112, 133; 360/99.08
See application file for complete search history.

(56) References Cited

U.S. PATENT DOCUMENTS

| | | | |
|---|---|---|---|
| 4,694,213 A | | 9/1987 | Gowda et al. |
| 5,108,198 A | * | 4/1992 | Nii et al. ........................ 384/133 |
| 5,372,432 A | * | 12/1994 | Ishikawa ....................... 384/133 |
| 5,757,097 A | * | 5/1998 | Sato ................................ 310/90 |
| 6,343,877 B1 | * | 2/2002 | Miura et al. .................. 384/100 |

FOREIGN PATENT DOCUMENTS

| | | | |
|---|---|---|---|
| EP | 0 269 264 A2 | | 6/1988 |
| JP | 04-38138 | * | 2/1992 |
| JP | 6-33941 | | 2/1994 |
| JP | 08-109923 | | 4/1996 |
| JP | 8-109923 | | 4/1996 |
| JP | 8-210365 | | 8/1996 |
| JP | 08-210365 | | 8/1996 |

(Continued)

*Primary Examiner* — William C Joyce
(74) *Attorney, Agent, or Firm* — Flynn, Thiel, Boutell & Tanis, P.C.

(57) ABSTRACT

A magnetic fluid is held by a magnetic field in a stationary state and by a centrifugal force during rotation, leaking and splashing of the magnetic fluid caused by the instability of the pumping of a dynamic pressure bearing are prevented without using a magnetic fluid with a high saturation magnetization value, and the service life of the dynamic pressure bearing is extended. For this purpose, a sleeve 3 having a protruding tubular section is fitted and fixed to the outer periphery of the shaft 1 having a thrust plate 2 formed in an axial vicinity so as to be rotatable relatively to the shaft, an annular cover 4 is formed outwardly from the thrust plate 2 in an axial direction, the radially inward end of the annular cover 4 serves as an opening, at least two clearance sections serve as a reservoir 10 for reserving the magnetic fluid, and a magnetomotive force member 15 is provided for concentrating the magnetic flux lines on the radially outer side of the end portion 13 of the magnetic fluid 12.

4 Claims, 13 Drawing Sheets

FOREIGN PATENT DOCUMENTS

| | | |
|---|---|---|
| JP | 10-96421 | 4/1998 |
| JP | 10-096421 | 4/1998 |
| JP | 11-247858 | 9/1999 |
| JP | 2001-112214 | 4/2001 |
| JP | 2001-309604 | * 11/2001 |

* cited by examiner (a)

(b)

DYNAMIC PRESSURE BEARING AND ROTATION MACHINE EMPLOYING SAME

BACKGROUND ART

The present invention relates to a dynamic pressure bearing, and more particularly to a dynamic pressure bearing that prevents leaking and splashing of a magnetic fluid and resolves the problems caused by an instability phenomenon of fluid pumping resulting from an imbalance in dynamic pressure.

In the prior art, dynamic pressure bearings have been known in which a thrust plate is fixed to an end of a shaft, a thrust dynamic pressure bearing section is formed by the axial face of the thrust plate and the opposite face of a protruding tubular section of a fitted sleeve, a radial dynamic pressure bearing section is formed by the outer peripheral face of the shaft and the opposite face of the protruding tubular section of the fitted sleeve, a lubricating oil is retained in the dynamic pressure bearing sections, and a dynamic pressure is generated by the rotation of a rotor. In such dynamic pressure bearings, the lubricating oil filling the dynamic pressure bearing sections has to be effectively prevented from leaking and splashing. Furthermore, because the lubricating oil, which is the medium of the magnetic fluid, evaporates into the atmosphere as time passes, the service life of the bearings is limited or they required maintenance such as refilling. Another problem associated with dynamic pressure bearings is that the rotation of a sleeve or the like is unstable due to an unstable flow of magnetic fluid caused by pumping originating in the dynamic pressure bearing sections. This unstable flow of magnetic fluid caused by pumping originates because the dynamic pressure generated in the dynamic pressure bearing is unbalanced in the upper and lower axial directions and the magnetic fluid flows in a certain single direction.

Devices to prevent the lubricating oil from leaking or splashing in which the end portions of magnetic fluid are magnetically sealed with seal gap sections by forming a magnetic circuit using magnetic materials and magnetic fluid are known (for example, see Patent Documents 1 and 2). However, those devices require a strong magnetic flux to hold the two end portions of the magnetic fluid and a magnetic circuit incorporating a powerful permanent magnet has to be formed inside the sleeve and shaft.

A taper seal using the balance between the surface tension and atmospheric pressure is also known (for example, see Patent Document 3). However, the taper seal has a function as a reservoir to reserve the lubricating oil, while maintaining a capillary phenomenon by enlarging the height of the tapered section gradually, therefore, for the taper seal to use the capillary phenomenon, the gap to retain the lubricating oil has to be narrow. Particularly, in dynamic pressure bearings with spindle motors used in 3.5-inch hard disk drives for computers, flexibility in designing the shape of the taper seal is strictly limited and a high machining accuracy based on mirror finishing or the like is required. As a result, the production cost of components is increased. Furthermore, in order to increase the accumulation capacity, the length of the tapered section has to be elongated because the taper angle cannot be enlarged enough, but this causes problems because the degree of freedom in designing the shape of the taper seal is restricted.

Patent Document 1: Japanese Patent Publication No. H6-33941 (Page 3, FIG. 1, and FIG. 3)
Patent Document 2: U.S. Pat. No. 4,694,213 Specification (Pages 3 to 5, FIG. 1)
Patent Document 3: Japanese Patent Publication No. 2001-112214 (Pages 4 and 5, FIG. 1)

DISCLOSURE OF THE INVENTION

Problems that the Invention is to Solve

The present invention was achieved to solve the above-described plurality of problems of the prior art.

The first task of the present invention is to hold the magnetic fluid by a magnetic field in a stationary state and to hold it mainly by a centrifugal force during rotation, as means for keeping the magnetic fluid. In order to hold the magnetic fluid during rotation mainly by a magnetic field, a magnetic fluid of a high saturation magnetization value or a magnet of a high magnetic force has to be used. However, magnetic fluids with a high saturation magnetization value generally tend to show a high viscosity, and as the viscosity of magnetic fluid increases, the torque loss of dynamic pressure bearing also rises. On the other hand, magnets of a high magnetic force such as samarium-cobalt or neodymium-ferrous-boron magnets are extremely expensive. In accordance with the present invention, because the magnetic fluid is held principally by a centrifugal force during rotation and because the magnetic fluid can be held by a magnetic field only in a stationary state, it is not necessary to use a magnetic fluid of a high saturation magnetization value, meanwhile an inexpensive magnet of a weak magnetic force such as a ferrite can be used.

The second task of the present invention is to provide a margin for the preservation capacity of the magnetic fluid used in the dynamic pressure bearing sections by providing a reservoir for magnetic fluid accumulation. Increasing the reservoir capacity of magnetic fluid makes it possible to extend the service life of the dynamic pressure bearing determined by the evaporation of a lubricating oil, which is the medium of the magnetic fluid, and to sufficiently deal with the volume expansion of the magnetic fluid caused by a temperature increase in the dynamic pressure bearing.

The third task of the present invention can prevent the degradation of bearing performance during rotation and prevent possible leaking and splashing of the magnetic fluid due to an instable phenomenon of pumping in the dynamic pressure bearing, by a centrifugal force and a communicating conduit provided in the sleeve.

The present invention employs the following constitution to solve the above-described problems.

(1) A dynamic pressure bearing in which a sleeve having a protruding tubular section for inserting into a toric thrust plate and a shaft is fitted to an outer periphery of said shaft having said toric thrust plate fitted and fixed thereto so as to be rotatable relatively to the shaft, a clearance section for generating a thrust dynamic pressure by an axially inner face of said thrust plate and an opposite axially outer face of the protruding tubular section, a clearance section for generating a radial dynamic pressure by an inner peripheral face of the protruding tubular section of said sleeve and an opposite outer peripheral face of the shaft, and a magnetic fluid is retained and sealed in the clearance sections, wherein an annular cover made of a nonmagnetic material is formed on the sleeve outwardly from said thrust plate in an axial direction via a clearance section, a radially inward end of said annular cover serves as an opening, at least two clearance sections of the clearance section between said thrust plate and said annular cover and a clearance section between a radially outward from said thrust plate and an opposite radially inward from the sleeve are used as a reservoir for reserving the magnetic fluid, an end portion of the magnetic fluid is kept in the clearance section between said thrust plate and said annular cover, which forms said reservoir, and a magnetomotive force member for concentrating the magnetic flux lines is provided on a radially outer side of the end portion of said magnetic fluid.

In a stationary state of the dynamic pressure bearing in accordance with the present invention, the end portions of the magnetic fluid are held by a magnetic field of a magnetomotive force member such as a permanent magnet. During rotation, a centrifugal force accompanying the rotation of the sleeve or shaft is applied and it holds the end portions of the magnetic fluid with a good stability. Thereby, leaking and splashing of the magnetic fluid can be reliably prevented and the magnetic fluid can be retained in the bearing sections at all times. Because it is enough for the magnet to hold the magnetic fluid mainly only in a stationary state, comparatively expensive magnets of a high magnetic force such as samarium-cobalt or neodymium-ferrous-boron magnets to generate the magnetic field are not necessary, and inexpensive magnets of a weak magnetic force such as ferrite magnets can be used.

The magnetomotive force member is integrally formed with or fixed, for example, to the sleeve, annular cover or thrust plate, so as to be positioned radially outside of the end portions of the magnetic fluid. Here, the sleeve as referred to herein includes all the parts that are fixed integrally to the protruding tubular section rotatably fitted to the outer periphery of the thrust plate and the shaft. Accordingly, though a rotor hub and a member having the protruding tubular section are physically different, they are all considered as sleeves in accordance with the present invention as long as they rotate integrally.

Magnetic flux lines generated by the magnetomotive member is preferably concentrated radially outside of the end positions of the magnetic fluid inside the reservoir. Therefore, the magnetization direction of the magnetomotive member is not limited to the axial direction and may be the radial direction.

Because the annular cover is a nonmagnetic material, it isn't involved in the magnetic seal means. Therefore, the shape of the annular cover may be parallel to the confronting thrust plate or may expand toward the opening.

The thrust plate may be formed integrally with the shaft. As described hereinabove, the sleeve as referred to herein includes all the parts that are fixed integrally to the protruding tubular section rotatably fitted to the outer periphery of the thrust plate and the shaft. Therefore, a section where the annular cover is provided can be considered as a sleeve, if it rotates integrally with the protruding tubular section. In addition, the case where the annular cover and the sleeve are formed integrally is also included in the scope of the present invention. The annular cover may be fixed to the sleeve, via a magnetomotive member such as a permanent magnet.

The reservoir needs to have a capacity sufficient to reserve the magnetic fluid. This capacity varies depending on the size of the dynamic pressure bearing, materials used for components of the dynamic pressure bearing and the filling amount of the magnetic fluid, but the reservoir in accordance with the present invention has a margin in the length or gap size of the reservoir because the reserved magnetic fluid is kept by a magnetic force and a centrifugal force. Moreover, the reservoir space can be designed to have any shape, the degree of design freedom is very high, a sufficient capacity can be easily ensured, and the production cost of parts can be reduced because highly accurate machining of the parts is not required.

The dynamic pressure bearing in accordance with the present invention can be used in a variety of rotating devices having a rotor fitted externally on a shaft and rotating. Examples of applications include bearings for various types of small precision motors for computer hard disk drives, fans, multimedia products such as CD, DVD, MO and optical disks, and fans, bearings for medium-size motors for household appliances, domestic installations, OA devices, units for vehicles and industrial uses, bearings for machine tools, bearings for medical devices, bearings for industrial equipment such as turbines, bearings for reels and vehicles such as automobiles, electric trains, ships and aircrafts, and bearings for equipment for production of semiconductors, electric and electronic devices, and other apparatuses.

(2) A dynamic pressure bearing in which a sleeve having a protruding tubular section for inserting into a toric seal plate and a shaft is fitted to an outer periphery of said shaft having said seal plate fitted and fixed thereto so as to be rotatable relatively to the shaft, a clearance section for generating a radial dynamic pressure by an inner peripheral face of the protruding tubular section of said sleeve and the opposite outer peripheral face of the shaft, and a magnetic fluid is retained and sealed in the clearance section, wherein an annular cover made of a nonmagnetic material is formed on the sleeve outwardly from said seal plate in an axial direction via a clearance section, a radially inward end of said annular cover serves as an opening, at least two clearance sections of the clearance section between said seal plate and said annular cover and a clearance section between a radially outward position from said seal plate and an opposite radially inward position from the sleeve form a reservoir for reserving the magnetic fluid, an end portion of the magnetic fluid is kept in the clearance section between said seal plate and said annular cover, which forms said reservoir, and a magnetomotive force member for concentrating the magnetic flux lines is provided on a radially outer side of the end portion of said magnetic fluid.

(3) The dynamic pressure bearing described in (1) or (2) hereinabove, wherein a magnetomotive force member is disposed on an axial outside face of the annular cover.

(4) The dynamic pressure bearing described in (1) to (3) hereinabove, wherein a pole piece is disposed on a surface of a magnetic pole of an annular permanent magnet as the magnetomotive force member.

Here, the magnetic piece acts to concentrate the magnetic flux lines from the magnetic pole surface of the permanent magnet to a radially outward position from the end portions of the magnetic fluid and also to a position in the reservoir.

The dynamic pressure bearing in accordance with the present invention can be used in any rotating device having a rotor fitted externally on a shaft and rotating, equally to (1) above.

(5) The dynamic pressure bearing described in (1) or (2) above, wherein the magnetomotive force member is disposed at the thrust plate or the seal plate.

When such a structure is adopted, a magnetic circuit is formed via the sleeve made of a magnetic material.

The dynamic pressure bearing in accordance with the present invention can be used in any rotating device having a rotor fitted externally on a shaft and rotating, equally to (1) above.

(6) The dynamic pressure bearing described in any one of (1) to (5) above, wherein a vertical communicating conduit is formed in the sleeve.

When such a structure is adopted, the magnetic fluid that moves due to pumping or the like flows back through the communicating conduit. As a result, the amount of the magnetic fluid retained in the axially upper and lower thrust bearing sections, radial bearing sections and reservoir is maintained at a constant level. In addition, because the generation of local negative pressure is prevented, degradation of bearing performance and leaking and splashing of the magnetic fluid do not occur.

The dynamic pressure bearing in accordance with the present invention can be used in any rotating device having a rotor fitted externally on a shaft and rotating, equally to (1) above.

(7) The dynamic pressure bearing according to (6), wherein a transverse communicating conduit is formed in the sleeve.

Because the transverse communicating conduit is formed, the magnetic fluid's flow constantly returns during rotation thereby, no local degradation occurs in the magnetic fluid. In addition, air bubbles that were admixed can be effectively released to the outside. As a result, bearing performance is not damaged.

The dynamic pressure bearing in accordance with the present invention can be used in any rotating device having a rotor fitted externally on a shaft and rotating, equally to (1) above.

(8) The dynamic pressure bearing according to any one of (1) to (7), wherein an annular step for inhibiting a capillary phenomenon is formed inwardly in a radial direction from an end of the opening of the annular cover, and/or, is formed inwardly in the radial direction from the thrust plate or the seal plate and also outwardly in the axial direction therefrom.

Here the annular step is formed, for example, by providing a step having an annular, smoothly rounded shape in the medium portion of the annular cover facing the thrust plate or the seal plate. The magnetic fluid is held by the magnetic force in a clearance section between the thrust plate or seal plate and the annular cover facing them. In a portion of a narrow clearance, an intermolecular force among the magnetic fluid and the thrust plate or seal plate and annular cover, and a capillary effect caused by an intermolecular force of the magnetic fluid act upon the magnetic fluid held in the clearance. By providing the annular, smoothly rounded shape, the direction of the intermolecular force among the thrust plate or seal plate and annular cover, and magnetic fluid changes at the round shaped section, and expanding the clearance toward the opening of the annular cover inhibits the capillary effect. Therefore, the end portion of the magnetic fluid is retained in the rising portions of the step. The shape of the step is not limited to the rounded shape and may be, for example, the form of a mountain-ridge line. That step's shape may be formed by providing a concave annular section on the radially inner side, and also on the axially outer side of the thrust plate or seal plate, or may be formed by a combination of the concave annular section of the thrust plate or seal plate and the rounded shape of the annular cover.

The dynamic pressure bearing in accordance with the present invention can be used in any rotating device having a rotor fitted externally on a shaft and rotating, equally to (1) above.

(9) A rotating device comprising the dynamic pressure bearing according to any one of (1) to (8).

The rotating device as referred to herein is any rotating bodies having a rotor fitted externally on a shaft and rotating.

Examples of such rotating devices include various types of small precision motors for computer hard disk drives, fans, multimedia products such as CD, DVD, MO and optical disks, and fans, medium-size motors for household appliances, domestic installations, OA devices, units for vehicles and industrial uses, as well as for machine tools, medical devices, turbines, reels, automobiles, electric trains, ships, aircrafts and other vehicles, and equipment for production of semiconductors, electric and electronic devices, and other apparatuses.

A variety of design forms can be devised when the dynamic pressure bearing is assembled in a rotating device. For example, in the case of a spindle motor used in computer hard disk drives, the scope of the present invention includes examples in which the sleeve and rotor hub are integrally molded and the annular cover and a magnetomotive force member are fixed thereto; the rotor hub is fixed to the sleeve and the annular cover or the like is fixed to the rotor hub; the protruding tubular section and rotor hub are fixed each other; the annular cover or the like is integrally molded with the sleeve; the rotor hub and annular cover are fixed only to one side of the sleeve in the axial direction; and the sleeve is composed of a plurality of members and the a rotor hub is fixed.

Effect of the Invention

The effect of the present invention is that because the magnetic fluid is held by a magnetic field in a stationary state and it is held mainly by a centrifugal force during rotation, no strong magnetic field is required to keep the magnetic fluid during rotation.

In accordance with the present invention, because a reservoir to reserve the magnetic fluid is provided, the accumulation capacity of the magnetic fluid used in the dynamic pressure bearing sections can have a margin, the service life of the dynamic pressure bearing determined due to the evaporation of the lubricating oil, which is the medium of the magnetic fluid, can be extended and it sufficiently deals with the volume expansion of the magnetic fluid caused by a temperature increase in the dynamic pressure bearing.

Another effect of the present invention is that the centrifugal force and communicating conduit provided inside the sleeve can prevent the degradation of bearing performance during rotation and can prevent possible leaking and splashing of the magnetic fluid caused by an instability phenomenon of pumping in the dynamic pressure bearing.

Figure 1:
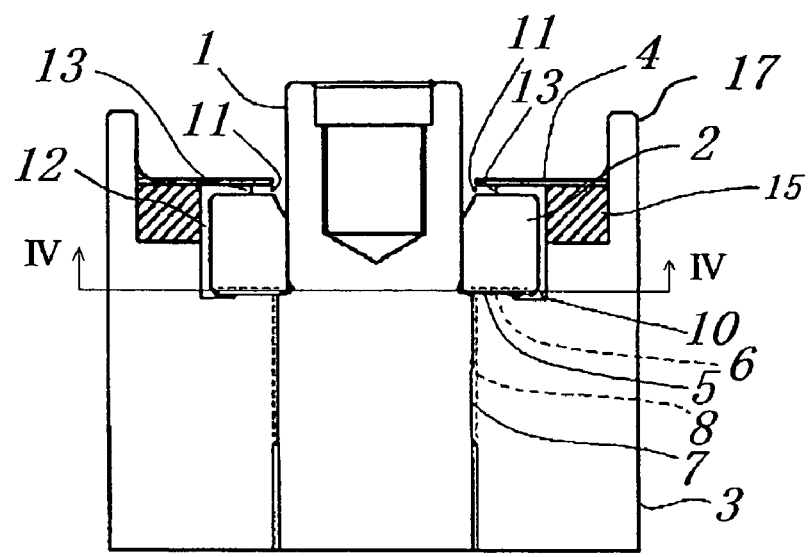
FIG. 1 is a longitudinal cross-sectional view illustrating an embodiment of the present invention.

DESCRIPTION OF THE NUMERALS 1, 31, 41 Shaft
2, 19, 42, 62 Thrust plate
3, 21, 23, 26, 33, 43, 63 Sleeve
4, 30, 44, 64, 104 Annular cover
5, 45, 65 Thrust bearing section
7, 47, 67 Radial bearing section
10 Reservoir
12, 72 Magnetic fluid
15, 16, 20, 25, 55, 106 Permanent magnet
18 Magnetic member
24, 27 Vertical communicating conduit
28 Transverse communicating conduit

BEST MODE FOR CARRYING OUT THE INVENTION

The present invention will be described below based on the embodiments illustrated in the drawings. Those embodiments will be explained with reference to a dynamic pressure bearing for a spindle motor used in computer hard disk drives. However, the present invention isn't limited to each example below.

Embodiment 1

FIG. 1 is a longitudinal cross-sectional view illustrating schematically an embodiment of the invention.

In FIG. 1, the dynamic pressure bearing is composed such that a sleeve 3 made of a nonmagnetic material having a protruding tubular section 17 is rotatably fitted to the outside of a fixed shaft 1 having a toric thrust plate 2 made of a magnetic material fixed thereto, a thrust bearing section 5 to generate a thrust dynamic pressure between the axially inner face of the thrust plate 2 and the axially outer face of the protruding tubular section 17, and a radial bearing section 7 to generate a radial dynamic pressure between the inner peripheral face of the protruding tubular section 17 and the opposite outer peripheral face of the shaft 1 are formed, and a magnetic fluid 12 is enclosed in those bearing sections 5, 7.

Figure 2:
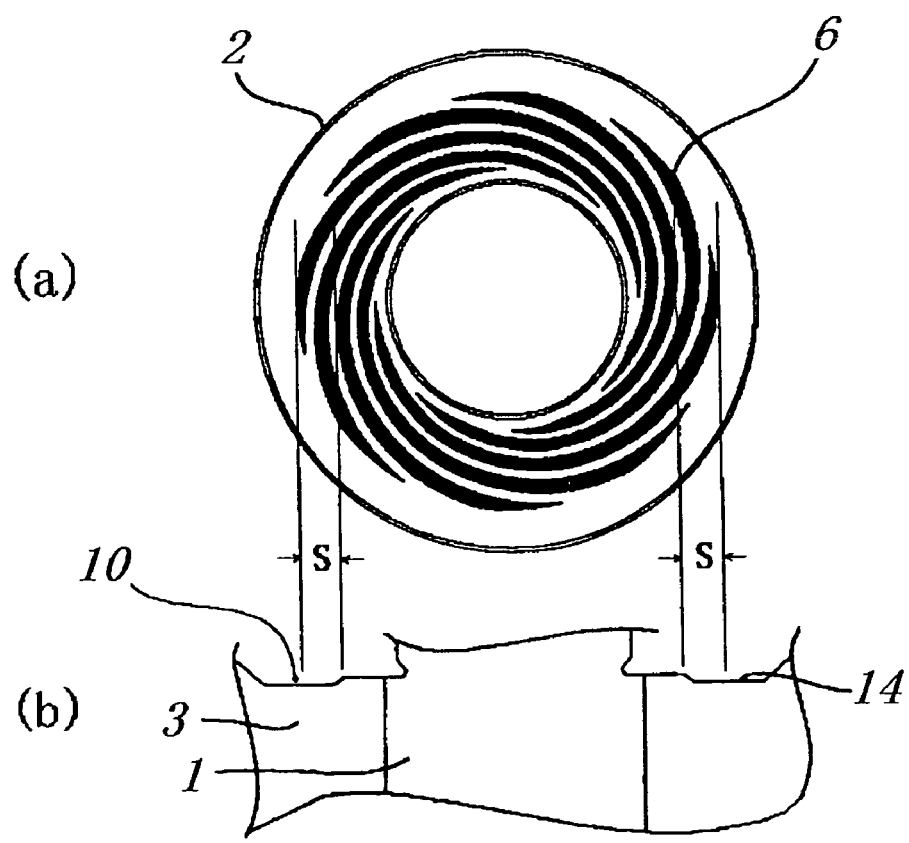
FIG. 2 is a plan view by cutting along the IV-IV arrow in FIG. 1 illustrating a dynamic pressure groove of a thrust plate in accordance with the present invention and a partial cross-sectional view illustrating the mutual arrangement with a sleeve.

In order to improve the bearing performance such as stiffness of the dynamic pressure bearing or damping, a thrust dynamic pressure groove 6 is generally formed in the thrust bearing section 5 and a radial dynamic pressure groove 8 is generally formed in the radial bearing section 7. Those dynamic pressure grooves 6, 8 are provided in the axially inner face of the thrust plate 2 or the opposite axially outer face of the protruding tubular section 17 of the sleeve 3, and, on the radially outer face of the shaft 1 or the opposite radially inner face of the protruding tubular section 17 of the sleeve 3. Dynamic pressure grooves of a spiral shape or herringbone shape can be used. The shape of the thrust dynamic pressure bearing 6 that is more effective in relation to a reservoir 10 will be explained below with reference to FIG. 2. FIG. 2(a) is a plan view of the thrust plate 2 by cutting along the IV-IV arrow, showing the dynamic pressure grooves 6 of a spiral shape presented in FIG. 1, and (b) is a partial cross-sectional view illustrating the mutual arrangement with the sleeve 3. When the dynamic pressure bearing rotates, the magnetic fluid 12 is pressed inwardly in radial direction by the working of the thrust dynamic pressure grooves 6 in the thrust plate 2. Furthermore, under the effect of the magnetic fluid 12 that was pressed forward, dynamic pressures are generated in the bearing sections 5, 7. The outer circumferential section of the spiral dynamic pressure grooves 6 in the present example becomes the margin section S projecting to the opposite face, on the thrust plate side, of a recess 14 formed outwardly in the radial direction from the thrust bearing section formed on the axially outer face of the protruding tubular section of the sleeve 3. The recess 14 is a groove shaping a part of the reservoir 10 and the magnetic fluid 12 is kept therein. Because a large amount of the magnetic fluid 12 is retained in the recess 14, the amount of the magnetic fluid 12 that flows into the thrust bearing section 5 because of the margin section S on the opposite face on the side of the thrust plate, of the recess 14 is larger than that in the case that no recess 14 is formed. By that flow, the dynamic pressures of the thrust bearing rise more effectively. In the case that the thrust dynamic pressure grooves 6 are formed on the axially outer face of the protruding tubular section of the sleeve 3, the axially outer face of the protruding tubular section of the sleeve 3 is shaped as a plane, and the recess 14 is formed in the axially inner face of the opposite thrust plate 2 so as to provide the reservoir and margin section S.

As shown in FIG. 1, an annular cover 4 made of a nonmagnetic material is fixed to the sleeve 3 outwardly in the axial direction from the thrust plate 2 via a clearance section of 0.3 mm filled with the magnetic fluid 12. The reservoir 10 for containing the magnetic fluid is composed of the clearance section formed by the thrust plate 2 and annular cover 4, a clearance section having a clearance of 0.2 mm formed by the radially outer face of the thrust plate 2 and the opposite radially inner face of the sleeve 3, and a clearance section having a clearance of 0.1 mm formed at the radially outer side of the thrust bearing section, on the radially outer side of the protruding tubular section of the sleeve 3, and also in the outer axial direction. Both end portions of the magnetic fluid 12 are retained in the clearance section between the annular cover 4 and thrust plate 2 forming the reservoir 10, and an annular permanent magnet 15 magnetized in the axial direction is sandwiched and held between the sleeve 3 and annular cover 4 on the radially outer side of both end portions 13, 13 of this magnetic fluid 12. Dimensions of specific spacing are not limited to those.

Here, the material of the shaft 1 is SUS (stainless steel) 304, the material of the thrust plate 2 is SUS420, the sleeve 3 is SUS304, the annular cover 4 is SUS304, and the permanent magnet 15 is made of a ferrite plastic magnet. However, the materials are not limited to those. For example, the shaft 1 may be made of SUS420 or the like.

Figure 3:
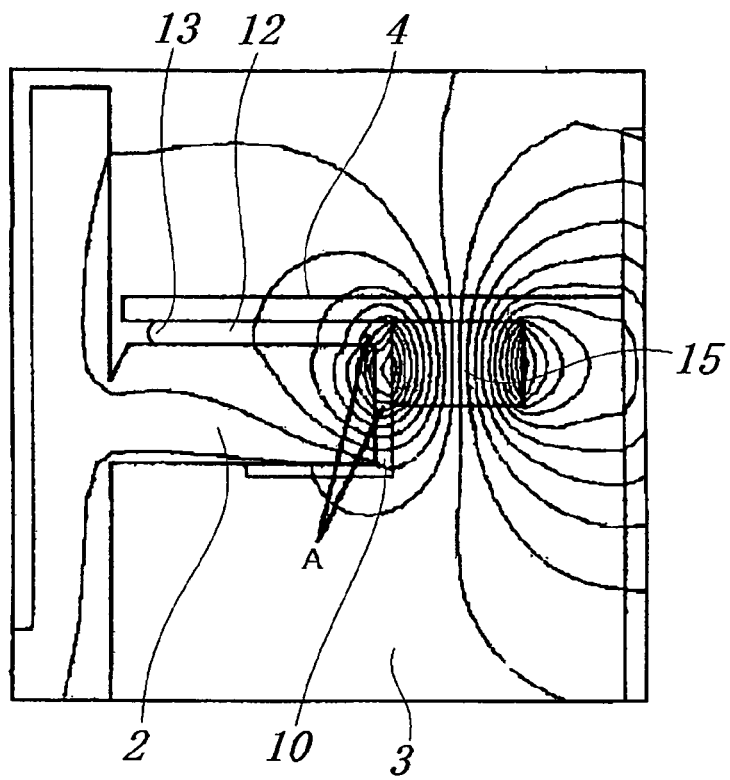
FIG. 3 is an analysis diagram of magnetic flux lines in the dynamic pressure bearing shown in FIG. 1.

In a stationary state, the end portion 13 of the magnetic fluid 12 is kept at the radially outer side of the opening 11 of the annular cover 4. This end portion 13 of the magnetic fluid 12 is held by the magnetic field created by the permanent magnet 15. FIG. 3 is an analysis diagram of magnetic flux lines illustrating the flow of the magnetic flux lines. Because the annular cover 4 or sleeve 3 is made of a nonmagnetic material, it produces no effect on the sealing function. The magnetic flux lines form a magnetic circuit passing through the thrust plate 2, which is a magnetic material, and the magnetic fluid 12 retained in the reservoir 10 and reaching the permanent magnet 15. The magnetic flux lines converge mainly at two positions indicated by A and a magnetic gradient is formed around these portions to hold the magnetic fluid 12.

Figure 4:
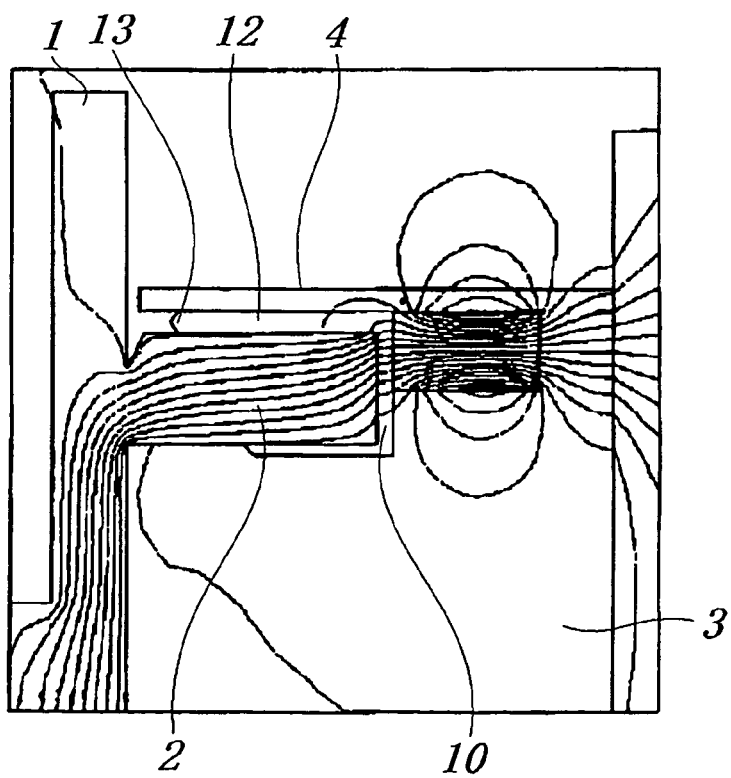
FIG. 4 is an analysis diagram of magnetic flux lines in another dynamic pressure bearing in accordance with the present invention.

The magnetization direction of the permanent magnet is not limited to the axial direction and may also be a radial direction. FIG. 4 is an analysis diagram of magnetic flux lines illustrating the flow of magnetic flux lines in the case that the magnetization direction of the permanent magnet is a radial one. Here, the annular cover 4 or sleeve 3 is made of a nonmagnetic material and the shaft 1 or thrust plate 2 is made of a magnetic material. The magnetic flux lines pass through the magnetic fluid 12 kept in the reservoir 10 and reach the thrust plate 2 and shaft 1. The magnetic flux lines converge at an outward radial direction from the end portion 13 of the magnetic fluid 12 and hold the end portion 13 of the magnetic fluid 12.

During rotation, a force pushing the magnetic fluid 12 outwardly in the radial direction acts almost proportionally to the surface area perpendicular to the axis under the effect of a centrifugal force. As a result, the end portion 13 of the magnetic fluid 12 is balanced and held with good stability.

The clearance section between the annular cover 4 and thrust plate 2 in the above-described reservoir 10 has a comparatively large clearance size of about 0.3 mm and the peripheral members constituting this clearance section do not require precision machining and can be easily fabricated. Furthermore, because a capillary phenomenon produces practically no effect, the magnetic fluid 12 does not move to the opening on the radial inside, and leaking or splashing of the magnetic fluid 12 from the opening 11 to the outside of the dynamic pressure bearing is prevented.

In Embodiment 1, the dynamic pressure bearing is constituted by the fixed shaft and rotary sleeve, but this configuration is not limiting, and the dynamic pressure bearing may be also constituted by a rotary shaft and a fixed shaft.

Embodiment 2

Figure 5:
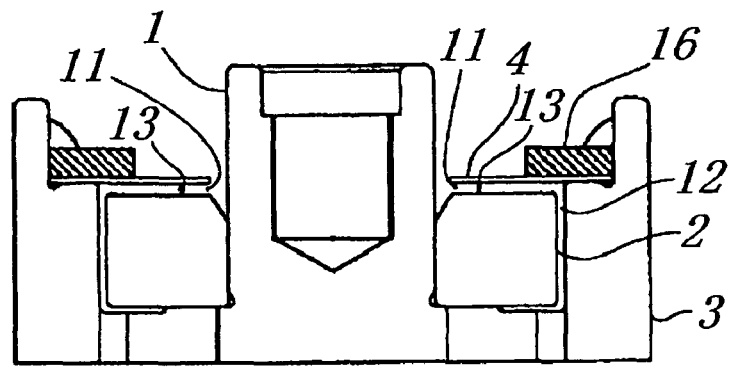
FIG. 5 is a longitudinal cross-sectional view illustrating an example of another embodiment of the present invention.

FIG. 5 is a longitudinal cross-sectional view which shows a partial schematic illustration of another embodiment of the invention.

In FIG. 5, the dynamic pressure bearing is assembled such that a toric thrust plate 2 composed of a magnetic material is fixed to a fixed shaft 1, and a sleeve 3 made of a nonmagnetic material and having a protruding tubular section to be fitted and inserted into the thrust plate 2 and shaft 1 is rotatably fitted on outside thereof. Also, an annular cover 4 made of a nonmagnetic material is fixed to the sleeve 3 via a clearance section filled with a magnetic fluid 12 outwardly of the thrust plate 2 in an axial direction. An annular permanent magnet 16 is fixed on the axially outer side of the annular cover 4 and on the radially outer side of an end portion 13 of the magnetic fluid 12.

In a stationary state, the end portion 13 of the magnetic fluid 12 is retained at the radially outer side of the opening 11. This end portion 13 of the magnetic fluid 12 is held by the magnetic field generated by the permanent magnet 16. In the dynamic pressure bearing when rotating, a centrifugal force is caused and it holds the end portion 13 of the magnetic fluid 12 with a good stability. Because a capillary phenomenon hardly has an affect, as with Embodiment 1, the magnetic fluid 12 does not move toward the radially inner side opening 11, and leaking or splashing of the magnetic fluid 12 from the opening 11 to the outside of the dynamic pressure bearing is prevented.

Embodiment 3

Figure 6:
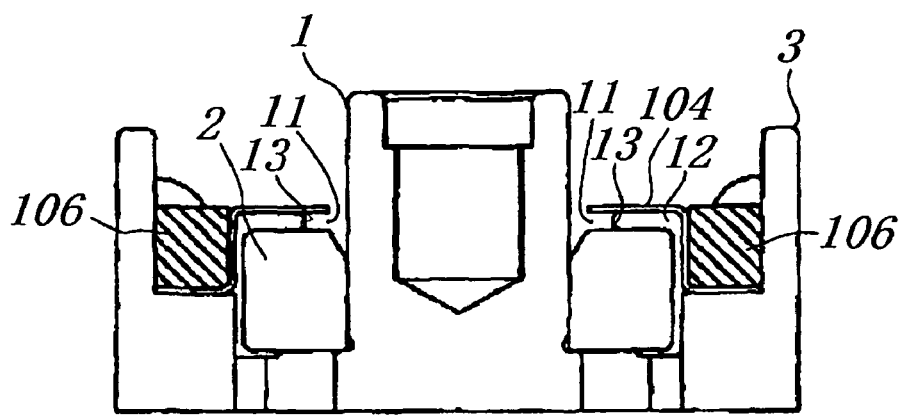
FIG. 6 is a longitudinal cross-sectional view illustrating an example of another embodiment of the present invention.

FIG. 6 is a longitudinal cross-sectional view illustrating an example of another embodiment of the invention.

In FIG. 6, the dynamic pressure bearing is composed such that a toric thrust plate 2 made of a magnetic material is fixed to a fixed shaft 1, and a sleeve 3 made of a nonmagnetic material and having a protruding tubular section to be fitted and inserted into the thrust plate 2 and shaft 1 is rotatably fitted to the outside thereof. Also, an annular cover 104 made of a nonmagnetic material is fixed to the sleeve 3 outwardly from the thrust plate 2 in the axial direction via a clearance section filled with a magnetic fluid 12. An annular permanent magnet 106 is fixed on the axially outer side of the annular cover 104 and radially outward of an end portion 13 of the magnetic fluid 12.

In a stationary state, the end portion 13 of the magnetic fluid 12 is kept at the radially outer side of an opening 11. This end portion 13 of the magnetic fluid 12 is held by the magnetic field generated by the permanent magnet 106. In the dynamic pressure bearing when rotating, a centrifugal force is generated and this force holds the end portion 13 of the magnetic fluid 12 with a good stability. Because no effect is produced by the capillary phenomenon, as with Embodiment 1, the end portion 13 of the magnetic fluid 12 does not move into the radially inner side opening 11 and leaking or splashing of the magnetic fluid 12 from the opening 11 to the outside of the dynamic pressure bearing is prevented.

Embodiment 4

Figure 7:
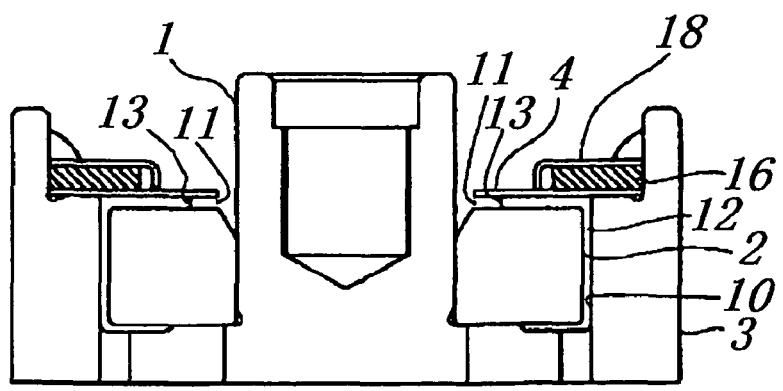
FIG. 7 is a longitudinal cross-sectional view illustrating an example of another embodiment of the present invention.

FIG. 7 is a longitudinal cross-sectional view illustrating a partial sketch of another embodiment of the present invention.

In FIG. 7, the dynamic pressure bearing is assembled such that a toric thrust plate 2 made of a magnetic material is fixed to a fixed shaft 1, and a sleeve 3 made of a nonmagnetic material and having a protruding tubular section to be put around the thrust plate 2 and shaft 1 is rotatably fitted to the outside thereof. Also, an annular cover 4 made of a nonmagnetic material is fixed to the sleeve 3 outwardly from the thrust plate 2 in the axial direction via a clearance section filled with a magnetic fluid 12. An annular permanent magnet 16 is fixed on the axially outer side of the annular cover 4, outwardly from an end portion 13 of the magnetic fluid 12 in a radial direction. In addition, an annular magnetic member 18 serving as a pole piece is disposed so as to cover the permanent magnet 16.

Figure 8:
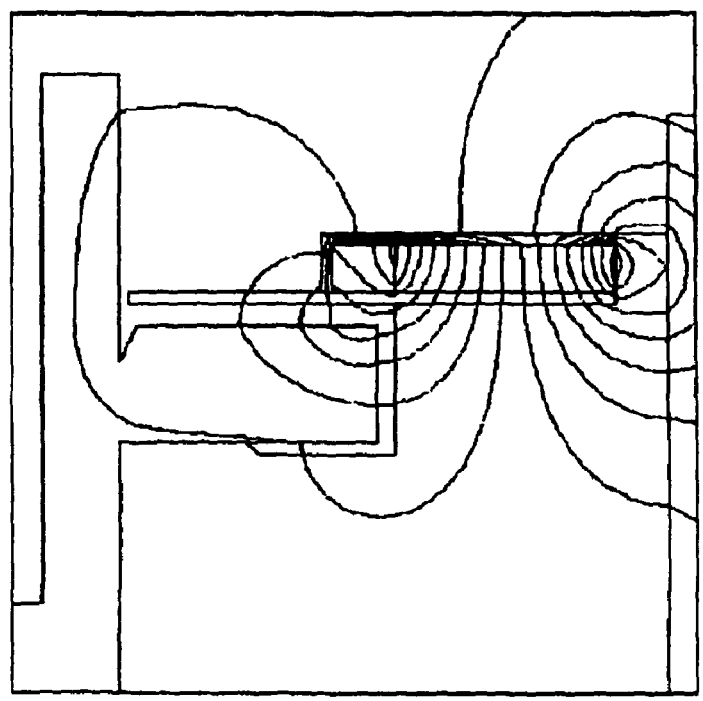
FIG. 8 is an analysis diagram of magnetic flux lines in the dynamic pressure bearing shown in FIG. 6.

In a stationary state, the end portion 13 of the magnetic fluid 12 is kept at the radially outer side of an opening 11. This end portion 13 of the magnetic fluid 12 is held by the magnetic field generated by the permanent magnet 16. FIG. 8 is an analysis diagram of the magnetic flux lines illustrating the flow of the magnetic flux lines in the present embodiment. The annular cover 4 is a nonmagnetic material and doesn't affect the sealing function. The magnetic flux lines form a magnetic circuit passing from the magnetic member 18, which is a pole piece, through the magnetic fluid 12 retained in a reservoir 10 and the thrust plate 2, which is a magnetic material, to the permanent magnet 16. The magnetic flux lines converge due to the action of the pole piece, and a magnetic gradient is formed around the convergence zone and holds the magnetic fluid 12. In the dynamic pressure bearing when rotating, a centrifugal force is generated and this force holds the end portion 13 of the magnetic fluid 12 with a good stability. Because no effect is produced by the capillary phenomenon, as with Embodiment 1, the end portion 13 of the magnetic fluid 12 does not move into the radially inner side opening 11 and leaking or splashing of the magnetic fluid 12 from the opening 11 to the outside of the dynamic pressure bearing is prevented.

Embodiment 5

Figure 9:
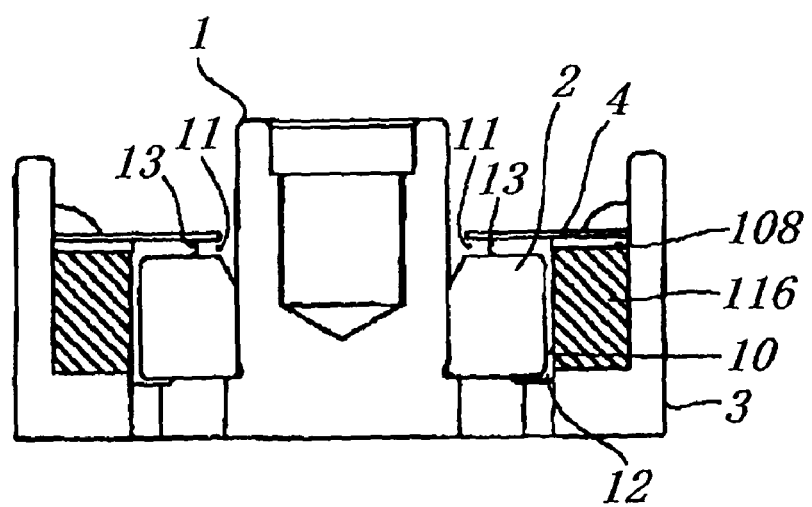
FIG. 9 is a longitudinal cross-sectional view illustrating an example of another embodiment of the present invention.

FIG. 9 is a longitudinal cross-sectional view illustrating an example of another embodiment of the invention.

In FIG. 9, the dynamic pressure bearing is composed such that a toric thrust plate 2 made of a magnetic material is fixed to a fixed shaft 1, and a sleeve 3 made of a nonmagnetic material and having a protruding tubular section to be put around the thrust plate 2 and shaft 1 is rotatably fitted to the outer periphery thereof. Also, an annular cover 4 made of a nonmagnetic material is fixed to the sleeve 3 outwardly from the thrust plate 2 in an axial direction via a clearance section filled with a magnetic fluid 12. An annular permanent magnet 116 is fixed to the sleeve 3 on the axial inside of the annular cover 4 and outwardly from an end portion 13 of the magnetic fluid 12 in a radial direction. In addition, an annular pole piece 108 is disposed so as to cover the permanent magnet 116.

In a stationary state, the end portion 13 of the magnetic fluid 12 is kept at the radially outer side of an opening 11. This end portion 13 of the magnetic fluid 12 is held by the magnetic field generated by the permanent magnet 116. The magnetic flux lines generated by the permanent magnet 116 converge because of the action of the pole piece 108, and a magnetic gradient is formed around the convergence zone and holds the magnetic fluid 12. In the dynamic pressure bearing when rotating, a centrifugal force is produced and this force holds the end portion 13 of the magnetic fluid 12 with a good stability. Because the capillary phenomenon hardly has any affect, as with Embodiment 1, the end portion 13 of the magnetic fluid 12 does not move into the radially inner side opening 11, and leaking or splashing of the magnetic fluid 12 from the opening 11 to the outside of the dynamic pressure bearing is prevented.

Embodiment 6

Figure 10:
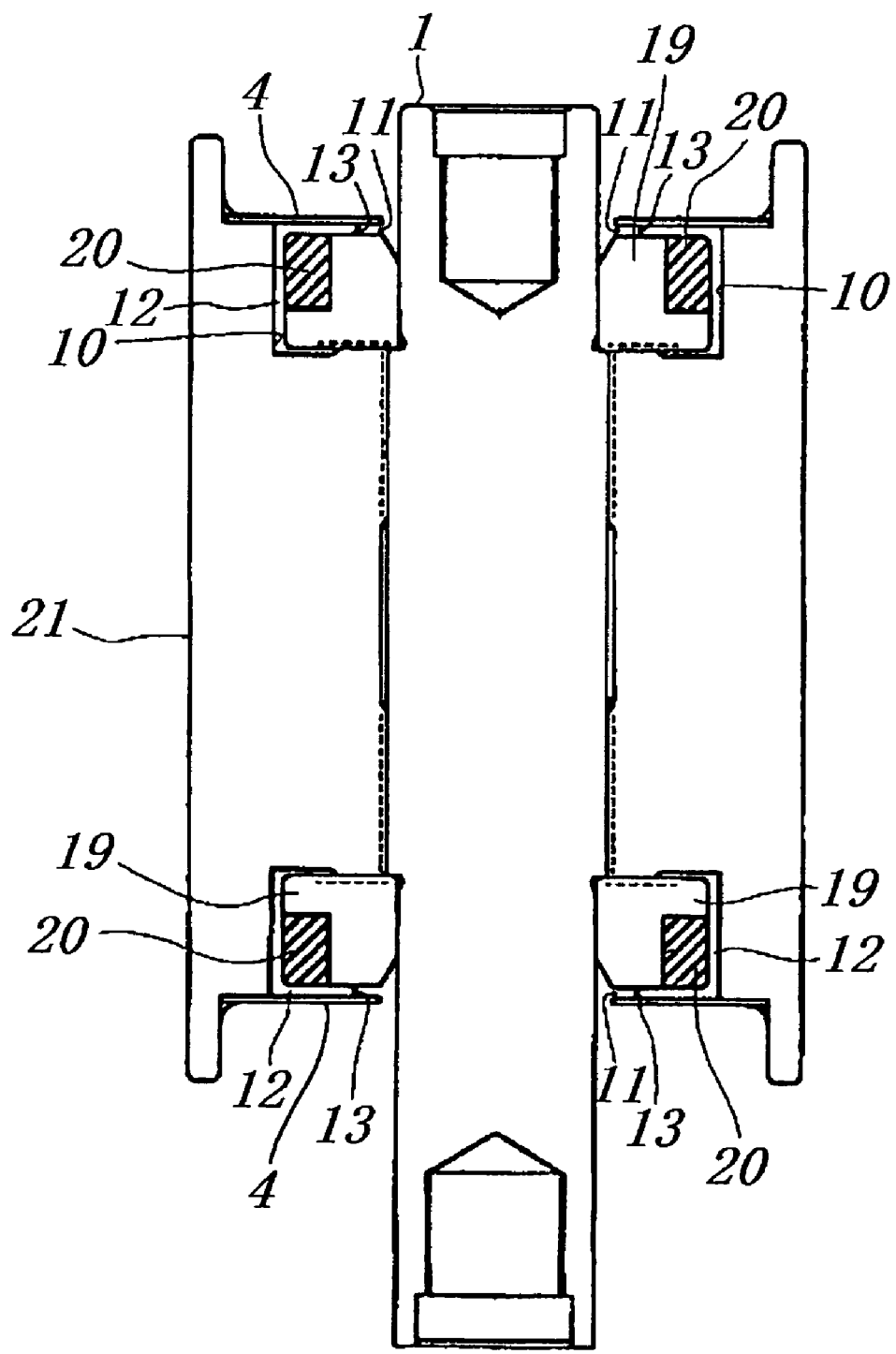
FIG. 10 is a longitudinal cross-sectional view illustrating an example of another embodiment of the present invention.

FIG. 10 is a longitudinal cross-sectional view illustrating schematically another embodiment of the invention.

In FIG. 10, the dynamic pressure bearing is composed such that a sleeve 21 made of a magnetic material and having a protruding tubular section to be inserted between thrust plates 19, 19 is rotatably fitted to the outer periphery of a fixed shaft 1 to which a pair of toric thrust plates 19, 19 made of nonmagnetic materials are fixed. Also, a pair of annular covers 4, 4 made of nonmagnetic materials are fixed to the sleeve 21 outwardly from the thrust plates 19 in an axial direction via a clearance section filled with a magnetic fluid 12. An annular permanent magnet 20 is integrally formed with the thrust plate 19 on the axial outer side from the two end portions 13, 13 of the magnetic fluid 12.

Here, it is preferred that the pressure of the magnetic fluid 12 in the dynamic pressure bearing section be increased in order to improve the bearing performance such as stiffness of the dynamic pressure bearing or damping. Accordingly, dynamic pressure grooves are usually provided in the axially inner face of the thrust plates 19, 19 or the opposite axially outer face of the protruding tubular section of the sleeve 21 and in the radially outer face of the shaft 1 or the opposite radially inner face of the protruding tubular section of the sleeve 21.

Here, the material of the shaft 1 is SUS304, the material of the thrust plate 19 is SUS304, the sleeve 21 is SUS430, the annular cover 4 is SUS304, and the permanent magnet 20 is formed from a ferrite plastic magnet. However, the materials are not limited to those.

Figure 11:
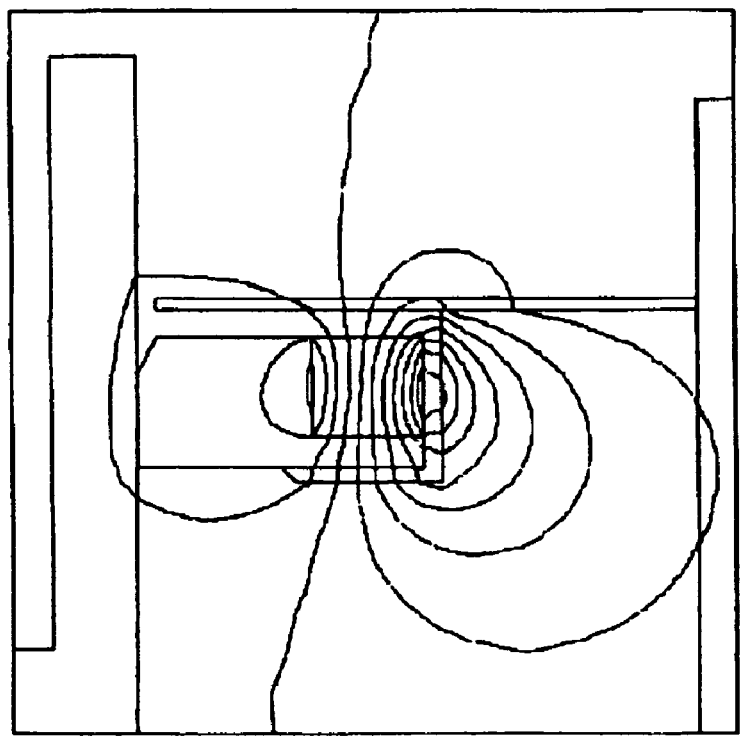
FIG. 11 is an analysis diagram of magnetic flux lines in the dynamic pressure bearing shown in FIG. 9.

In the dynamic pressure bearing in a stationary state, the end portions 13, 13 of the magnetic fluid 12 are kept at the radial outer side of an opening 11. Those end portions 13, 13 of the magnetic fluid 12 are held by the magnetic field generated by the permanent magnet 20. FIG. 11 is an analysis diagram of magnetic flux lines illustrating the flow of the magnetic flux lines. Because the annular cover 4 and thrust plates 19 are made of nonmagnetic materials, they don't affect the sealing function. The magnetic flux lines form a magnetic circuit passing through the sleeve 21, which is a magnetic material, and the magnetic fluid 12 retained in a reservoir 10 to the permanent magnet 20. A magnetic gradient is formed around the portions where the magnetic flux lines converge and the magnetic fluid 12 is held thereby.

In the dynamic pressure bearing when rotating, a centrifugal force acts and holds the end portions 13, 13 of the magnetic fluid 12 with a good stability. In particular, the clearance section between the thrust plate 19 and annular cover 4 has a large clearance size of about 0.3 mm, and the peripheral members constituting this clearance section can be easily fabricated, without a need for precise machining. Because a capillary phenomenon has scarcely any affect, the end portions 13, 13 of the magnetic fluid 12 do not move into the radially inner side opening 11, and leaking or splashing of the magnetic fluid 12, which is held by the magnetic force, from the opening 11 of the annular cover 4 to the outside of the dynamic pressure bearing is prevented.

Embodiment 7

Figure 12:
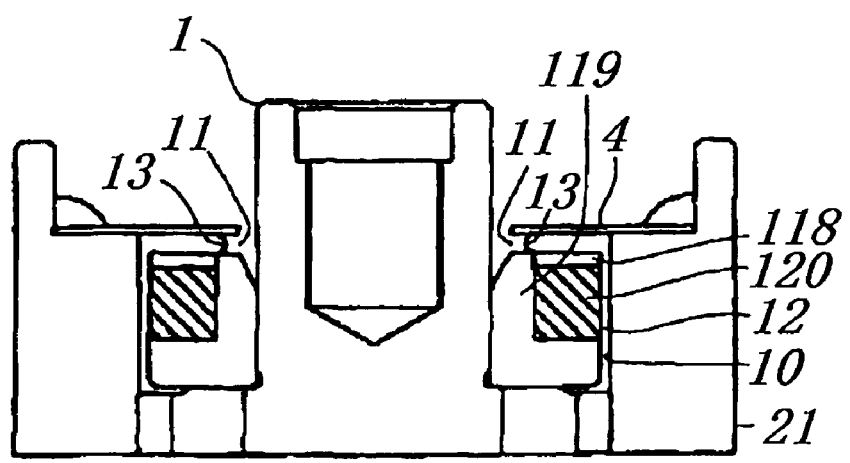
FIG. 12 is a longitudinal cross-sectional view illustrating an example of another embodiment of the present invention.

FIG. 12 is a longitudinal cross-sectional view illustrating an example of another embodiment of the invention.

In FIG. 12, the dynamic pressure bearing is assembled such that a toric thrust plate 119 made of a nonmagnetic material is fixed to a shaft 1, and a sleeve 21 made of a magnetic material and having a protruding tubular section to be put around the thrust plate 119 and shaft 1 is rotatably fitted to the outer periphery of the shaft. Also, an annular cover 4 made of a nonmagnetic material is fixed to the sleeve 21 outwardly from the thrust plate 119 in an axial direction via a clearance section filled with a magnetic fluid 12. An annular permanent magnet 120 and a pole piece 118 are molded integrally with the thrust plate 119 on the radially outer side of end portions 13, 13 of the magnetic fluid 12.

In the dynamic pressure bearing in a stationary state, the end portion 13 of the magnetic fluid 12 is kept at the radially outer side of an opening 11. This end portion 13 of the magnetic fluid 12 is held by the magnetic field generated by the permanent magnet 120. The magnetic flux lines generated by the pole piece 118 fixed to the magnetic pole surface of the permanent magnet 120 converge on the radially outer side, pass through the magnetic fluid 12 retained in a reservoir 10 and the sleeve 21, which is a magnetic material, and form a magnetic circuit. A magnetic gradient is formed around the portion where the magnetic flux lines converge and the magnetic fluid 12 is held thereby.

In the dynamic pressure bearing when rotating, a centrifugal force acts and holds the end portion 13 of the magnetic fluid 12 with a good stability. Because the capillary phenomenon has hardly any effect, the end portion 13 of the magnetic fluid 12 does not move into the radially inside opening 11, and leaking or splashing of the magnetic fluid 12, which is held by the magnetic force, from the opening 11 of the annular cover 4 to the outer side of the dynamic pressure bearing is prevented.

Embodiment 8

Figure 13:
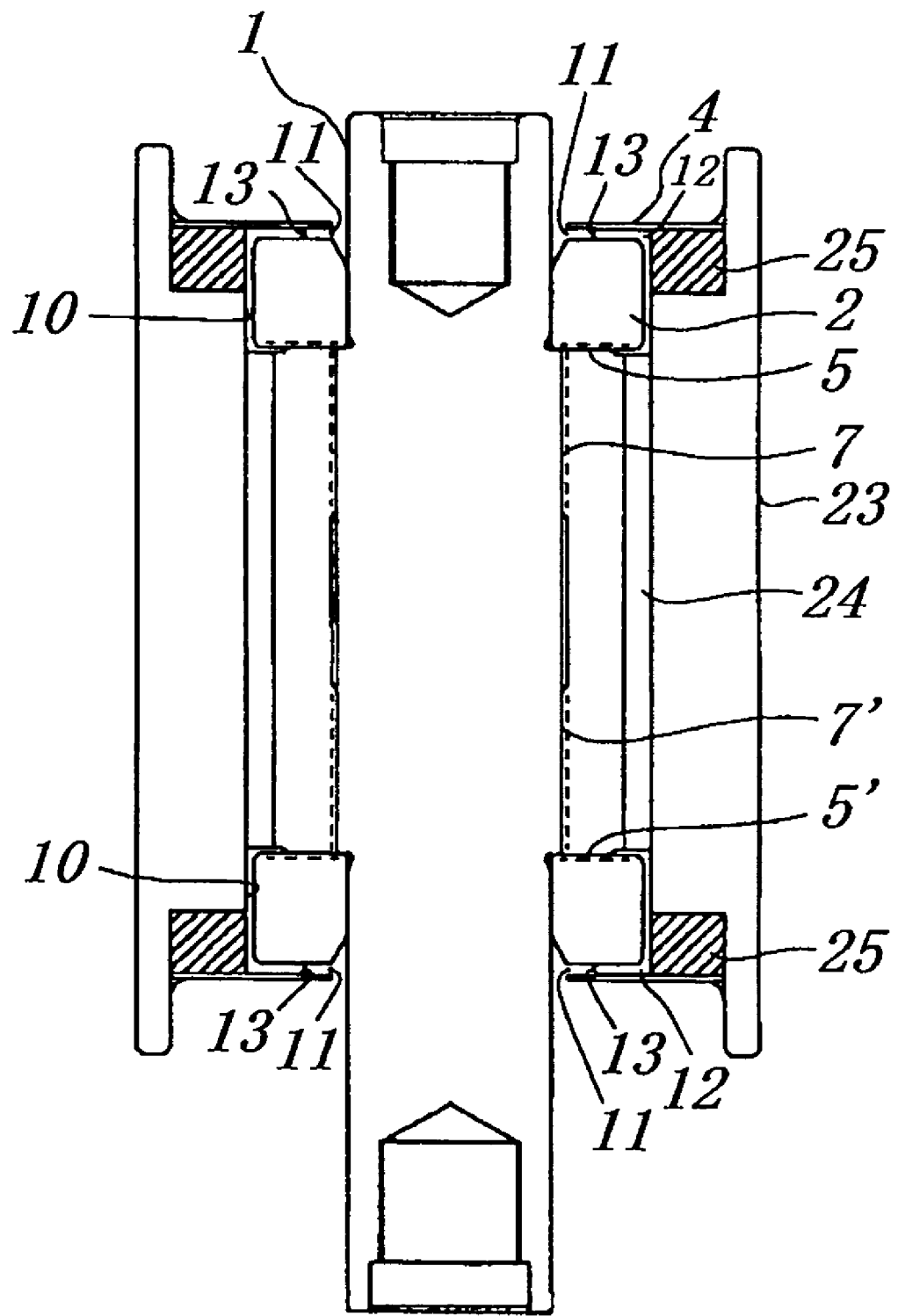
FIG. 13 is a longitudinal cross-sectional view illustrating an example of another embodiment of the present invention.

FIG. 13 is a longitudinal cross-sectional view illustrating schematically another embodiment of the invention.

In FIG. 13, the dynamic pressure bearing is composed such that a sleeve 23 made of a nonmagnetic material and having a protruding tubular section to be inserted between both thrust plates 2 is rotatably fitted to the outer periphery of a fixed shaft 1 whose upper and lower portions have a pair of toric thrust plates 2 made of magnetic materials and fixed thereto. Also, a pair of annular covers 4 made of nonmagnetic materials are fixed to the sleeve 23 outwardly from the pair of thrust plates 2 in an axial direction via a clearance section filled with a magnetic fluid 12. An annular permanent magnet 25 is sandwiched and held between the sleeve 23 and annular cover 4 outwardly in a radial direction from the two end portions of the magnetic fluid 12. A vertical communicating conduit 24 is formed in two locations in the sleeve 23. The vertical communicating conduit 24 may be formed in one location or in three or more locations as long as the dynamic pressure bearing can operate with a good stability.

Here, it is preferred that the pressure of the magnetic fluid 12 in dynamic pressure bearing sections 5, 7, 5', 7' be increased to improve the bearing performance such as the stiffness of the dynamic pressure bearing or damping. Accordingly, dynamic pressure grooves are usually provided in the axially inner face of the thrust plates 2, 2 or the opposite axially outer face of the protruding tubular section of the sleeve 23, and in the radially outer face of the shaft 1 or the opposite radially inner face of the protruding tubular section of the sleeve 23.

Because the vertical communicating conduits are formed, a stable dynamic pressure is constantly generated in the bearing sections 5, 7, 5, 7 during rotation. For example, when the magnetic fluid 12 retained in the thrust bearing section 5' and radial bearing section 7' on the axially lower side flows into the thrust bearing section 5 and radial bearing section 7 on the axially upper side, a centrifugal force acts to balance the two end portions 13, 13 of the magnetic fluid 12 located at the axially upper side and axially lower side. Therefore, the magnetic fluid 12 does not flow out through the reservoir 10 to an opening 11 on the axially upper side. The magnetic fluid 12 flows into the vertical communicating conduit 24 and flows into the bearing sections 5', 7' from which the magnetic fluid 12 has flown out, then, the retained amount of the magnetic fluid in the thrust bearing sections 5, 5', and radial bearing sections 7, 7' and the reservoir 10 on the axial upper and axial lower sides cannot be imbalanced and drained, a constant retained amount is usually maintained, and the degradation of bearing performance and leaking or splashing of the magnetic fluid 12 doesn't occur.

Embodiment 9

Figure 14:
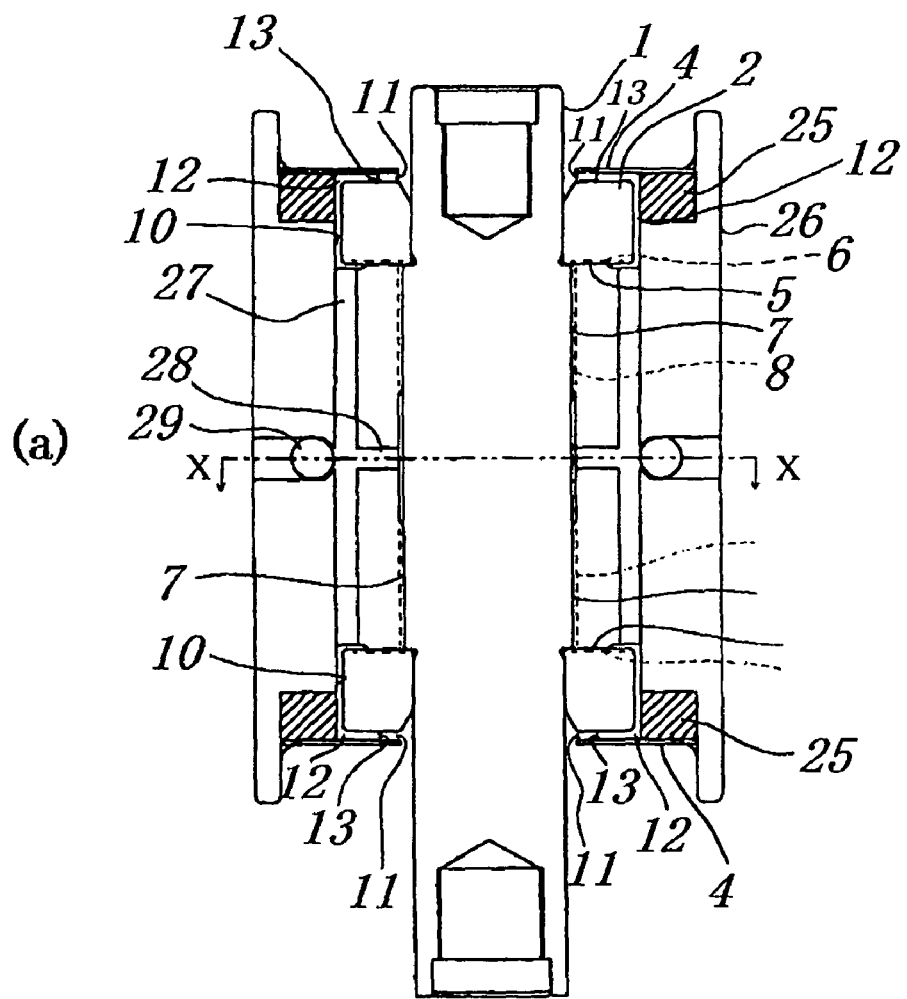
FIG. 14(a) is a longitudinal cross-sectional view illustrating an example of another embodiment of the present invention; (b) is a cross-sectional view by cutting along the X-X arrow in figure (a)
Figure 14:
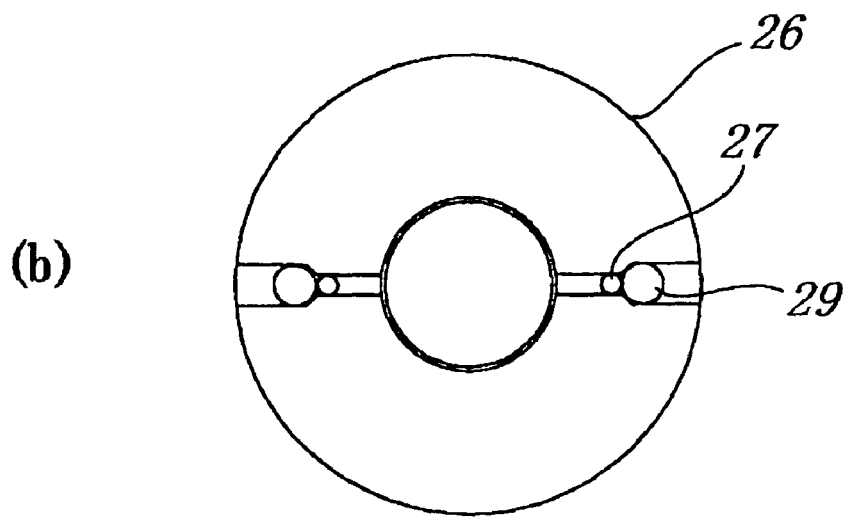

FIG. 14(*a*) is a longitudinal cross-sectional view illustrating schematically another embodiment of the invention. FIG. 14(*b*) is a cross-sectional view by cutting along the X-X arrow in FIG. 14(*a*).

In FIG. 14, the dynamic pressure bearing is assembled such that a sleeve 26 made of a nonmagnetic material and having a protruding tubular section to be put between two thrust plates 2 is rotatably fitted to the outer periphery of a fixed shaft 1 whose upper and lower portions have a pair of toric thrust plates 2 made of magnetic materials and fixed thereto. Also, a pair of annular covers 4 made of nonmagnetic materials are fixed to the sleeve 26 outwardly from the pair of thrust plates 2 in an axial direction via a clearance section filled with a magnetic fluid 12. An annular permanent magnet 25 is sandwiched and held between the sleeve 26 and annular cover 4 on the radially outer side of the two end portions 13, 13 of the magnetic fluid 12. A vertical communicating conduit 27 and transverse communicating conduit 28 are formed in two locations in the sleeve 26, and a fluorinated rubber ball 29 is disposed for sealing. The transverse communicating conduit 28 may be formed in one location or in a plurality of locations, but it has to be linked to the vertical communicating conduit 27.

Spiral dynamic pressure grooves 6, 7 are formed in the axial inner faces of the thrust plates 2, 2 and the radial outer face of the shaft 1. Dynamic pressure grooves 6 may be also formed in the axial outer face of the protruding tubular section of the sleeve 26. Dynamic pressure grooves 7 may be formed in the radially inner face of the protruding tubular section of sleeve 26. Dynamic pressure grooves 6 are not limited to spiral dynamic pressure grooves and may have any shape, as long as they allow the magnetic fluid 12 to flow in the shaft direction. For example, they may have the shape of herringbone dynamic pressure grooves or the like. By the formation of the dynamic pressure grooves 6, 7 and transverse communicating conduit 28, the magnetic fluid 12 flows inwardly in a radial direction because of the dynamic pressure structure when rotating, passes through the dynamic pressure bearing sections 5, 7, 5, 7, flows from the transverse communicating conduit 28 through the vertical communicating conduit 27, and returns to the dynamic pressure bearing sections 5, 7, 5, 7. By such a return flow, the magnetic fluid 12 doesn't locally stagnate and a portion of the magnetic fluid 12 doesn't deteriorate. Thus, the service life of the dynamic pressure bearing can be extended and it can be used with good stability over a long period. Air bubbles that were admixed at the injection of the magnetic fluid sometimes remain between the radial bearing sections 7, 7 at the upper and lower portion in an axial direction, or air bubbles sometimes penetrate therebetween. Such air bubbles can penetrate into both radial bearing sections 7, 7 as the bearing rotates and adversely affect the dynamic pressure generation function. However, by forming the transverse communicating conduit 28, air bubbles present between the two radial bearing sections 7, 7 return together with the magnetic fluid 12 through the transverse communicating conduit 28 and only the air bubbles contained in the returned magnetic fluid 12 are released from the openings 11 through the reservoir 10, 10. As a result, air bubbles remaining in the bearing sections or the like cannot damage the bearing function.

Embodiment 10

Figure 15:
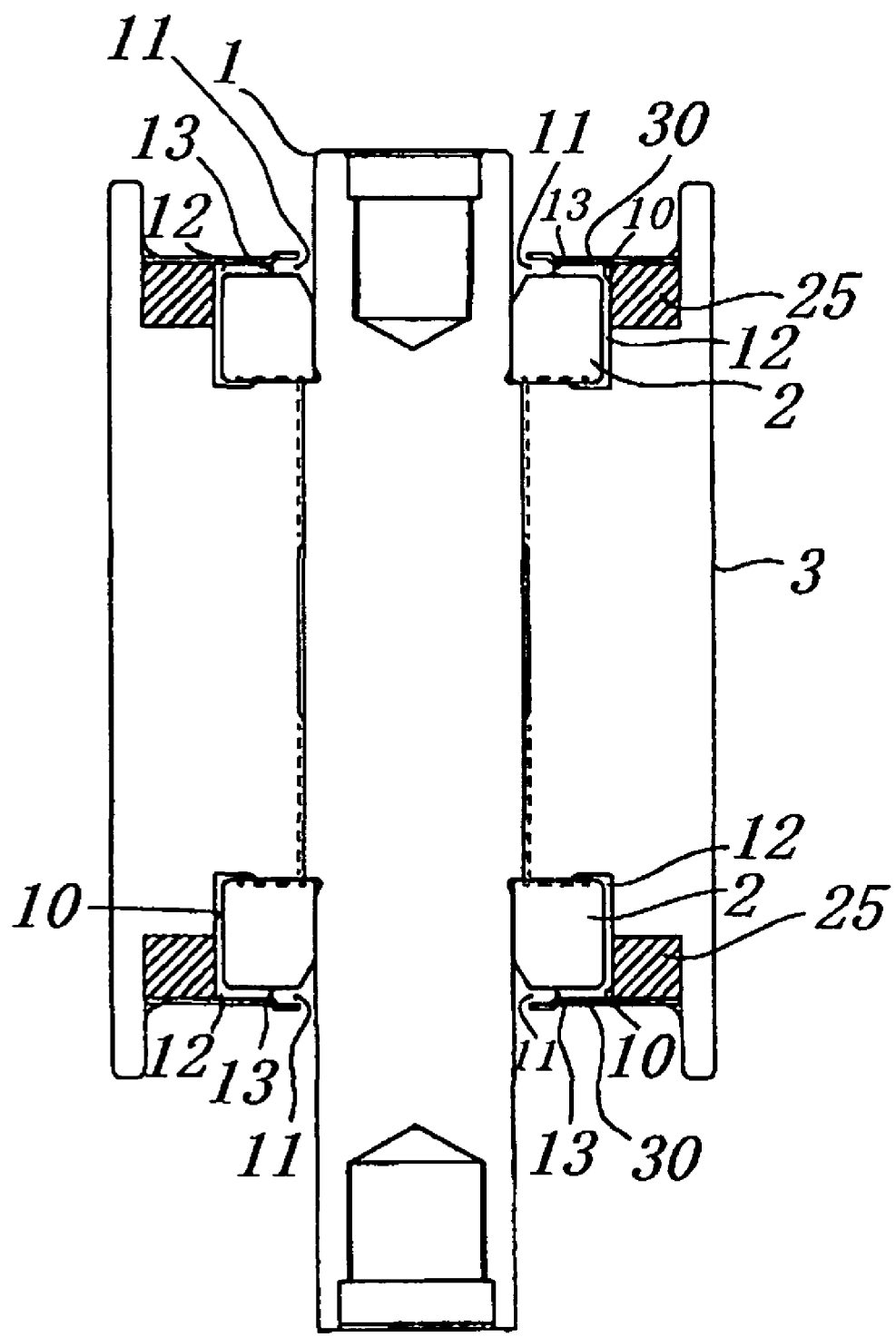
FIG. 15 is a longitudinal cross-sectional view illustrating an example of another embodiment of the present invention.

FIG. 15 is a longitudinal cross-sectional view illustrating schematically another embodiment of the invention.

In FIG. 15, the dynamic pressure bearing is assembled such that a sleeve 3 made of a nonmagnetic material and having a protruding tubular section to be inserted between two thrust plates 2, 2 is rotatably fitted to the outer periphery of a fixed shaft 1 whose upper and lower portions have a pair of toric thrust plates 2, 2 made of magnetic materials and fixed thereto. Also, a pair of annular covers 30, 30 made of nonmagnetic materials are fixed to the sleeve 3 outwardly from the pair of thrust plates 2, 2 in an axial direction via a clearance section filled with a magnetic fluid 12. An annular permanent magnet 25 is sandwiched and held between the sleeve 3 and annular cover 30, on the radially outer side of the two end portions 13, 13 of the magnetic fluid 12.

Here, it is preferred that the pressure of the magnetic fluid 12 in the dynamic pressure bearing section be increased to improve the bearing performance such as stiffness of the dynamic pressure bearing or damping. Accordingly, dynamic pressure grooves are usually provided in the axially inner face of the thrust plates 2, 2 or the opposite axially outer face of the protruding tubular section of the sleeve 3, and in the radially outer face of the shaft 1 or the opposite radially inner face of the protruding tubular section of the sleeve 3.

In the present embodiment, an annular step is formed at the end of the annular cover 30 on the side of the opening 11 so as to keep both ends 13, 13 of the magnetic fluid 12. By the annular step, the spacing between the thrust plate 2 and annular cover 30 is 0.5 mm in the vicinity of the opening 11 and as small as 0.3 mm on the stepless radially outer side.

In the case of a stepless annular cover, since an equal capillary force acts until the opening 11, a clearance of at least 0.5 mm is necessary to inhibit sufficiently the capillary phenomenon in a stationary state. However, if the reservoir capacity enlarges according to the expansion of the clearance between the annular cover 30 and thrust plate 2, the volume of the magnetic fluid 12 that has to be kept therein also increases. Accordingly, if something from the outside impacts it, the magnetic force cannot hold the magnetic fluid 12 and the probability of the magnetic fluid 12 splashing or leaking increases. By adopting the annular cover 30 of the present embodiment, due to intermolecular force among the thrust plate 2, annular cover 30 and magnetic fluid 12 acting in the section of a narrow clearance in a stationary state, and intermolecular forces in the magnetic fluid 12, the direction of intermolecular forces in the section of an annular step of the annular plate changes and the capillary phenomenon is inhibited. As a result, the magnetic fluid cannot flow over the step easily, and this, in combination with magnetic sealing means, prevents the end portion 13 of the magnetic fluid 12 from reaching the annular plate opening 11. Moreover, a further unnecessary increase of the capacity of the reservoir 10 is avoided and the resistance of the magnetic fluid against impacts causing splashing or leaking is improved.

Embodiment 11

Figure 16:
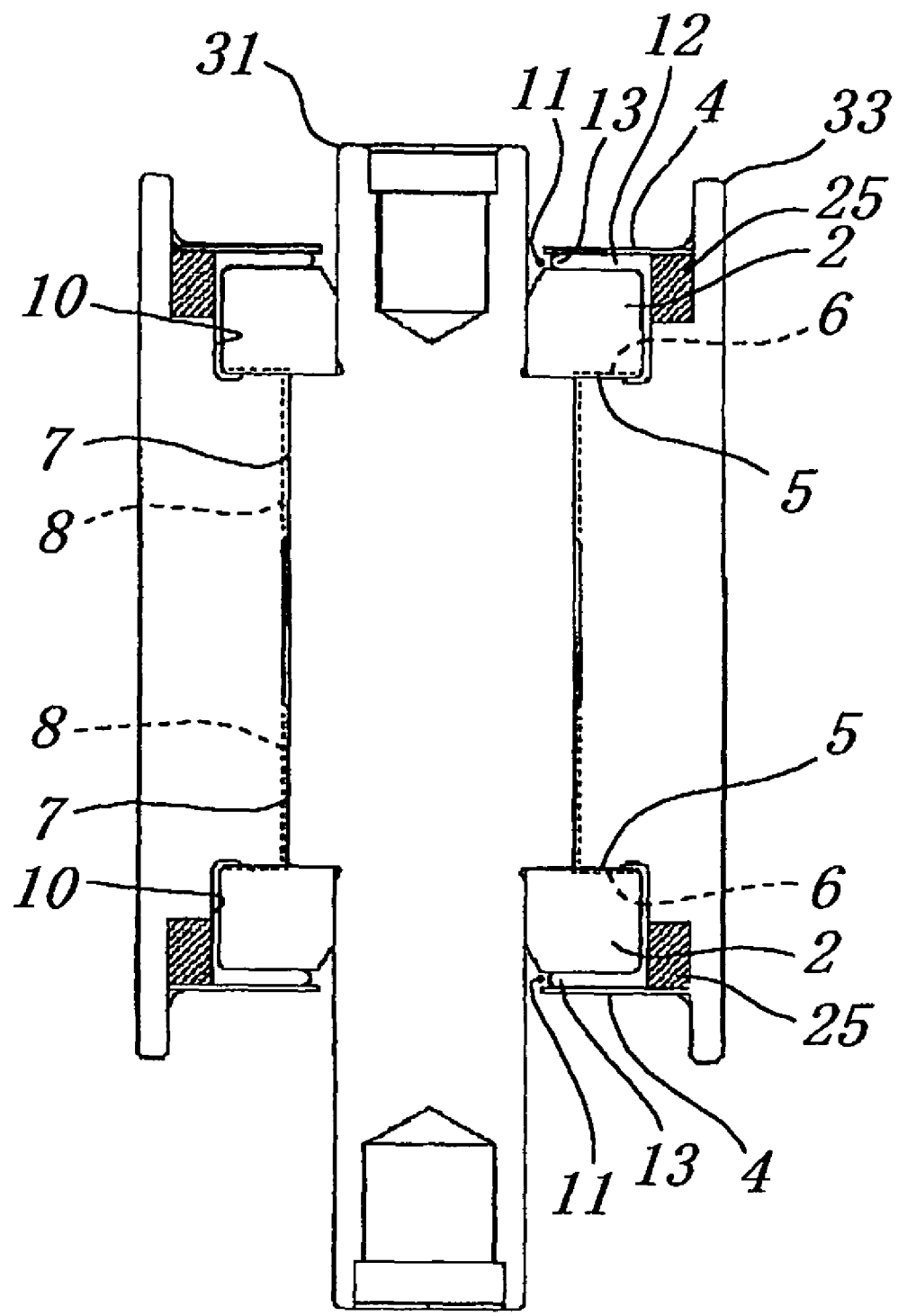
FIG. 16 is a longitudinal cross-sectional view illustrating an example of another embodiment of the present invention.

FIG. 16 is a longitudinal cross-sectional view illustrating schematically another embodiment of the present invention.

In FIG. 16, the dynamic pressure bearing is composed such that a sleeve 33 made of a nonmagnetic material and having a protruding tubular section to be put between two thrust plates 2, 2 is rotatably fitted to the outer periphery of a fixed shaft 31 whose upper and lower portions have a pair of toric thrust plates 2, 2 made of magnetic materials and fixed thereto. Also, a pair of annular covers 4, 4 made of nonmagnetic materials are fixed to the sleeve 33 outwardly from the pair of thrust plates 2, 2 in an axial direction via a clearance section filled with a magnetic fluid 12. Annular permanent magnets 25, 25 are sandwiched and held between the sleeve 33 and annular covers 4, 4 on the radially outer side of the two end portions 13, 13 of the magnetic fluid 12.

Here, it is preferred that the pressure of the magnetic fluid 12 in the dynamic pressure bearing section be increased to improve the bearing performance such as the stiffness of the dynamic pressure bearing or damping. Accordingly, dynamic pressure grooves are usually provided in the axially inner face of the thrust plates 2, 2 or the opposite axially outer face of the protruding tubular section of the sleeve 33, and in the radially outer face of the shaft 1 or the opposite radially inner face of the protruding tubular section of the sleeve 33.

In the present embodiment, radial bearing sections 7, 7 are positioned outwardly from the two end portions 13, 13 of the magnetic fluid 12 in the vicinity of an opening in a radial direction. The radial bearing sections 7, 7 in the present embodiment are required to be located outwardly from almost the same position as the two end surfaces of the magnetic fluid 12 in a radial direction. When the bearing rotates, the internal pressure of the magnetic fluid 12 rises by the action of the centrifugal force, but this increase of internal pressure occurs only in the magnetic fluid located outwardly from the end surfaces 13, 13 of the magnetic fluid in the vicinity of the opening in a radial direction, and for the magnetic fluid located inwardly in a radial direction from the end surfaces 13, 13 of the magnetic fluid, the internal pressure decreases.

In the present embodiment, since the entire magnetic fluid 12, including the magnetic fluid retained in the thrust bearing section 5 and radial bearing section 7, is located outwardly from the end portions 13, 13 of the magnetic fluid in a radial direction, a centrifugal force acts in the direction of increasing the internal pressure on the magnetic fluid in any location. Moreover, because the magnetic fluid 12 with an increased internal pressure is supplied to the dynamic pressure grooves 6, 8, 6, 8 of the bearing sections 5, 7, 5, 7, the pressure generated by the dynamic pressure generating mechanism increases and the bearing performance is improved.

Embodiment 12

Figure 17:
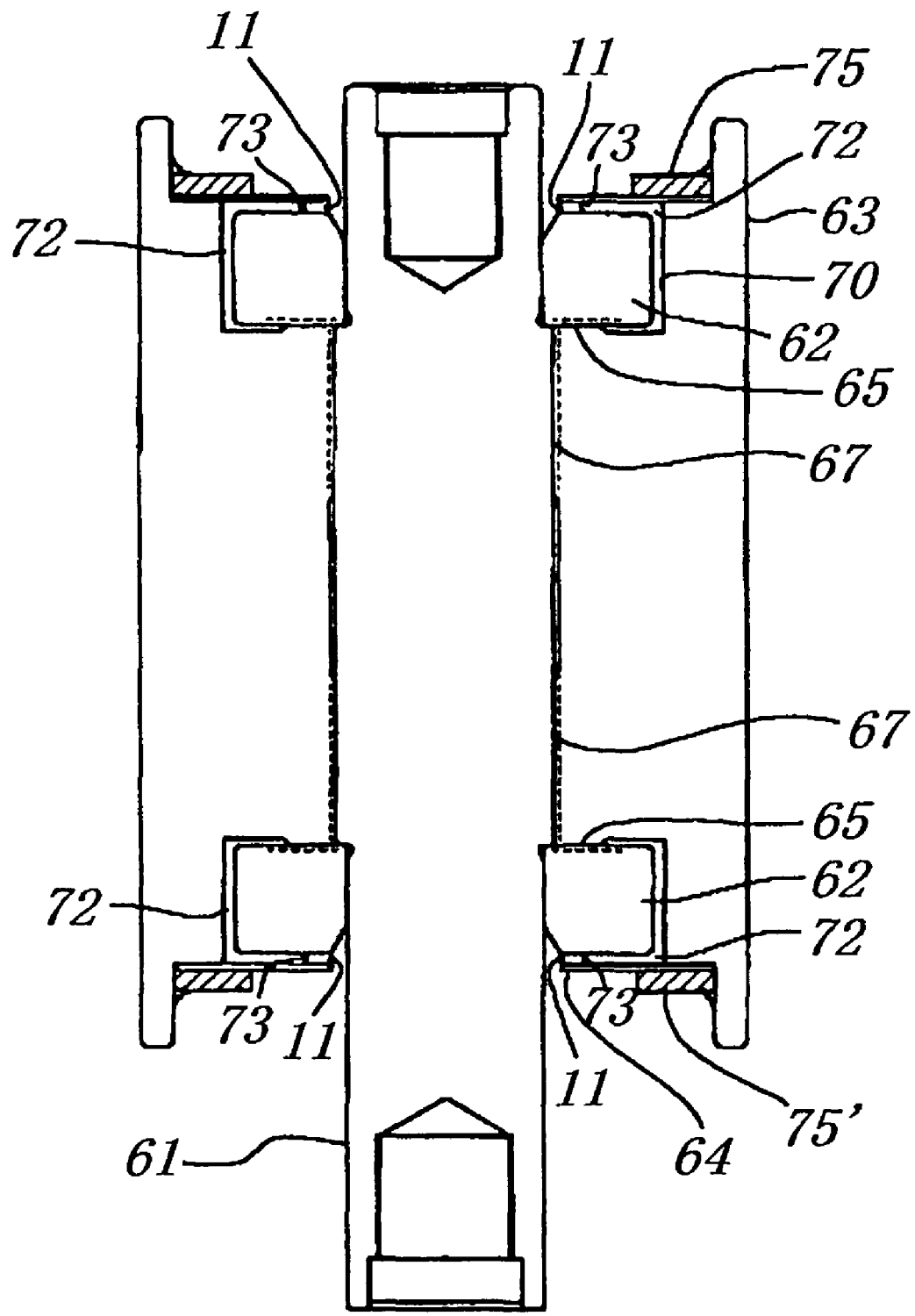
FIG. 17 is a longitudinal cross-sectional view illustrating an example of a manufacturing method in accordance with the present invention.

A method for the manufacture of the dynamic pressure bearing will be described with reference to FIG. 17. This manufacturing method is that a magnetic fluid is injected without sealing magnetically one of the openings where an end portion of the magnetic fluid is present.

A sleeve 63 having a protruding tubular section to be put between two thrust plates 62, 62 is rotatably fitted to the outer periphery of a shaft 61 to which a pair of toric thrust plates 62 are fixed in the vicinity of both axial ends; a thrust bearing section 65 to generate thrust dynamic pressures by the axially inner faces of the two thrust plates 62, 62 and the axially outer faces of the protruding tubular section, and radial bearing sections 67 to generate radial dynamic pressures by the inner peripheral face of the protruding tubular section and the outer peripheral face of the shaft are formed; a pair of annular covers 64, 64 are fixed to the sleeve 63 outwardly from the thrust plates 62 in an axial direction via a clearance section; the clearance section between the thrust plate 62 and annular cover 64 and the clearance section between the radially outer face of the thrust plate 62 and opposite radially inner face of the sleeve 63 are used as a reservoir 70 for magnetic fluid retention; a permanent magnet 75' is fixed on the axially outer side of the annular cover 64 located on the axial lower side; thereafter a magnetic fluid 72 is filled from opening 11 of the other annular cover 64 and the shaft so that the two end portions 73, 73 of the magnetic fluid 72 are retained in the clearance section between the thrust plate 62 and annular cover 64; and then the permanent magnet 75 is fixed on the axially outer side of the annular cover 64 located on the axially upper side.

By this manufacturing method, the magnetic fluid 72 can be injected into clearances such as dynamic pressure sections and the reservoir 70, without being affected by the magnetic force of the permanent magnet 75.

Embodiment 13

A method for the manufacture of the dynamic pressure bearing will be described with reference to FIG. 17. This manufacturing method is that a magnetic fluid 72 is injected before the permanent magnets 75, 75' are fixed.

First, a sleeve 63 having a protruding tubular section to be inserted between two thrust plates 62, 62 is rotatably fitted to the outer periphery of a shaft 61 having a pair of toric thrust plates 62 fixed thereto in the vicinity of both axial ends; thrust bearing sections 65 to generate thrust dynamic pressures by the axially inner faces of the two thrust plates 62, 62 and the axially outer faces of the protruding tubular section, and radial bearing sections 67 to generate radial dynamic pressures by the inner peripheral face of the protruding tubular section and the outer peripheral face of the shaft are formed; a pair of annular covers 64 are fixed to the sleeve 63 outwardly from the thrust plates 62 in an axial direction via a clearance section; the clearance section between the thrust plate 62 and annular cover 64 and the clearance section between the radially outer face of the thrust plate 62 and the opposite radially inner face of the sleeve 63 are used as a reservoir 70 for magnetic fluid retention; the magnetic fluid 72 is injected from the opening 11 so that the two end portions 73, 73 of the magnetic fluid 72 are retained in the clearance section between the thrust plate 62 and annular cover 64; thereafter, permanent magnets 75, 75' are fixed on the axially outer side of the annular cover 64.

By this manufacturing method, the magnetic fluid 72 can be injected into clearances such as dynamic pressure sections and the reservoir 70, without being affected by the magnetic force of the permanent magnets 75, 75'.

Embodiment 14

Figure 18:
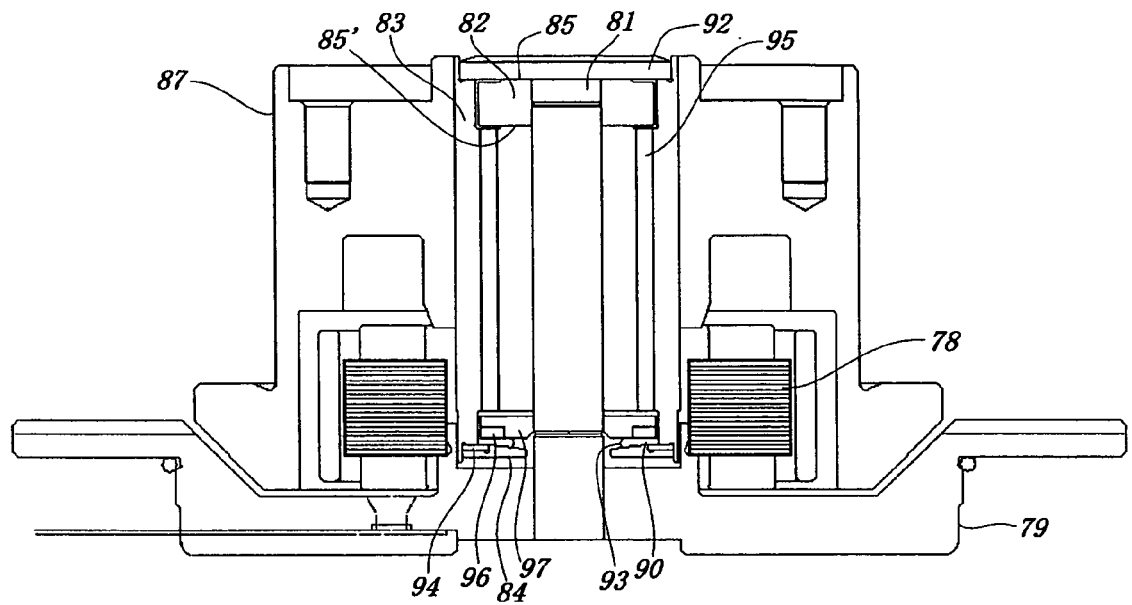
FIG. 18 is a longitudinal cross-sectional view illustrating an example of a direct current motor in accordance with the present invention.

FIG. 18 is a longitudinal cross-sectional view illustrating schematically an embodiment of a direct current motor.

A spindle motor shown in FIG. 18 comprises a bracket 79 to which a stator core 78 is fixed, a shaft 81 having a lower portion thereof fixed in the central opening of the bracket 79, a sleeve 83 rotationally fitted to the outer periphery of the shaft 81, and a rotor hub 87 fitted to the outer periphery of the sleeve 83. The upper end of the sleeve 83 is sealed with a counter plate 92, and thrust bearing sections 85, 85' comprise the upper face of the thrust plate 82 and the opposite lower face of the counter plate 92, and the lower face of the thrust plate 82 and the opposite upper face of the protruding tubular portion of the sleeve 83. An end portion 93 of a magnetic fluid 90 is kept in a clearance section between an annular cover 84 fixed to the lower end of the sleeve 83 and a seal plate 97 in which a magnet 96 fixed to the vicinity of the lower end of the shaft 81 was formed. A pole piece 94 is fitted and fixed to the annular cover 84. The pole piece 94 controls the flow of magnetic flux lines in the sealing section and enhances the magnetic flux density. The annular cover 84 and seal plate 97 are made of nonmagnetic materials, and the pole piece 94 is made of a magnetic material.

A vertical communicating conduit 95 is formed in the sleeve 83. As for the vertical communicating conduit 95, depending on a balance of oil pumping in the thrust bearing section 85 facing the counter plate 92 and the thrust bearing section 85' located on the opposite surface thereof, a negative pressure is sometimes caused on the side surface portion of the thrust plate 82, and when this negative pressure is generated, pumping is disrupted or air bubbles appear in the negative pressure generated portions. In such cases, the side face portion of the thrust plate 82 can communicate with the liquid surface that is exposed to the atmosphere by the vertical communicating conduit 95, then the occurrence of negative pressure in this portion can be prevented. In the present embodiment, the vertical communicating conduits 95 are formed in two facing locations. Such vertical communicating conduits 95 are preferably provided in a plurality of locations equally spaced on the circumference. This is because the rotation of the sleeve 83 with the vertical communicating conduits 95 formed therein is required to balance the weight.

In the present embodiment, the sleeve 83 and rotor hub 87 are formed by fitting externally, but the rotor hub 87 and sleeve 83 may be also molded integrally.

Embodiment 15

Figure 19:
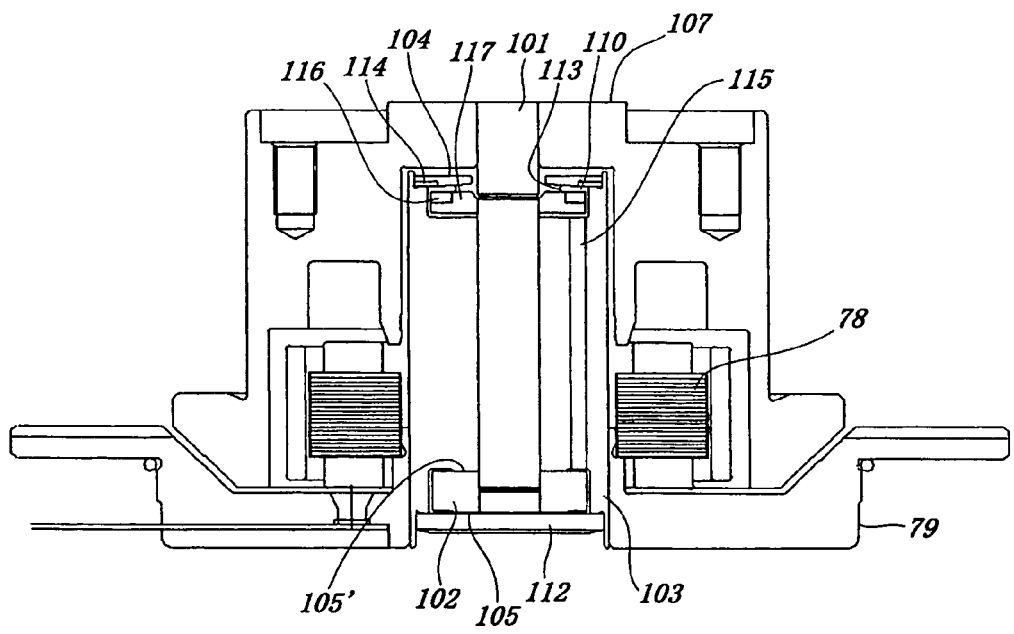
FIG. 19 is a longitudinal cross-sectional view illustrating an example of another direct current motor in accordance with the present invention.

FIG. 19 is a longitudinal cross-sectional view illustrating schematically another embodiment of a direct current motor.

A spindle motor shown in FIG. 19 comprises a bracket 79 to which a stator core 78 is fixed, a sleeve 103 having a lower portion thereof fixed in the central opening of the bracket 79, a shaft 101 of which a seal plate 117 and a thrust plate 102 are both fitted and fixed rotatably with respect to the sleeve 103 to the inside, and a rotor hub 107 fitted to the outer side of the shaft 101. The lower end of the sleeve 103 is sealed by the counter plate 112; and thrust bearing sections 105, 105' comprise the lower face of the thrust plate 102 and the opposite upper face of the counter plate 112 and the upper face of the thrust plate 102 and the opposite lower face of the protruding tubular section of the sleeve 103. An end portion 113 of a magnetic fluid 110 is retained in a clearance section between an annular cover 104 fixed to the upper end of the sleeve 103 and a seal plate 117 having a magnet 116 formed therein. A pole piece 114 is fitted and fixed to the annular cover 104. The pole piece 114 controls the flow of magnetic flux lines in the sealing section and enhances the magnetic flux density. The annular cover 104 and seal plate 117 are made of nonmagnetic materials, and the pole piece 114 is made of a magnetic material. A vertical communicating conduit 115 is formed in the sleeve 103 to prevent the occurrence of a negative pressure in the side face portion of the thrust plate 102. In the present embodiment the vertical communicating conduit 115 is formed in one location. This is because the sleeve 103 with the vertical communicating conduit 115 formed therein is fixed to the bracket 79 and does not rotate, then it is unnecessary to balance the weight.

Embodiment 16

Figure 20:
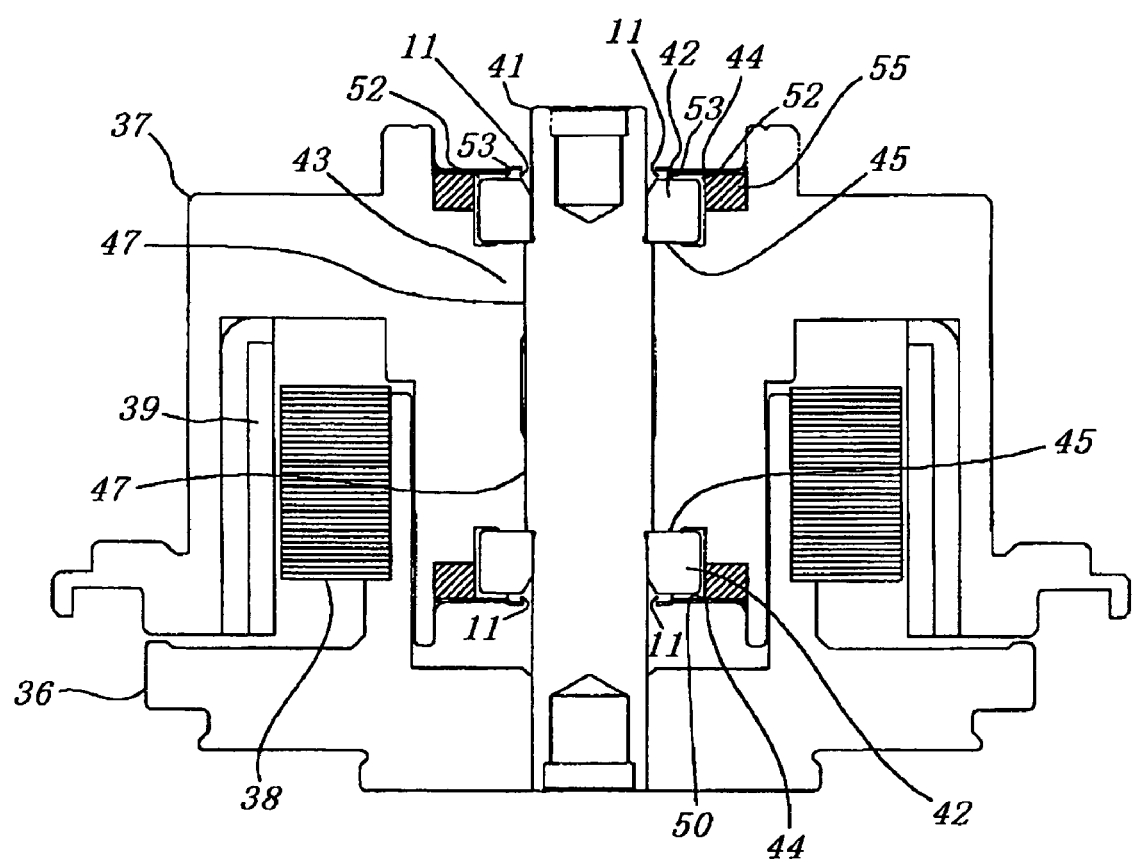
FIG. 20 is a longitudinal cross-sectional view illustrating an example of another direct current motor in accordance with the present invention.

FIG. 20 is a longitudinal cross-sectional view illustrating schematically another embodiment of a direct current motor.

A spindle motor shown in FIG. 20 comprises a bracket 36 to which a stator core 38 is fixed, a shaft 41 having an end portion thereof fixed in the central opening of the bracket 36, a sleeve 43 fitted externally to the shaft 41, rotatably with respect to the shaft 41, and having a permanent magnet 55 fixedly attached thereto, and a rotor hub (sleeve) 37 having the sleeve 43 and a rotor magnet 39 fixed thereto. In accordance with the present invention, an annular cover 44 is fixed to the rotor hub (sleeve) 37. In the present embodiment, the sleeve 43 and rotor hub 37 are molded integrally, but the rotor hub 37 and sleeve 43 may be formed with separate members and fixed each other.

A pair of thrust plates 42 are fixed to the vicinity of both axial end portions of the fixed shaft 41; thrust bearing sections 45, 45 are formed in the axially inner face of the thrust plates 42 and the opposite axially outer face of the protruding tubular section of the sleeve 43; and radial bearing sections 47, 47 are formed in the radially inner face of the protruding tubular section of the sleeve 43 and the opposite radially outer face of the shaft 41. Each bearing section is filled with a magnetic fluid, thrust dynamic pressures are generated in the thrust bearing sections 45, 45, and radial dynamic pressures are generated in the radial bearing sections 47, 47.

Here, it is preferred that the pressure of a magnetic fluid 52 in the dynamic pressure bearing sections 45, 47, 45, 47 be increased to improve the bearing performance such as stiffness of the dynamic pressure bearing or damping. Accordingly, dynamic pressure grooves are usually provided in the axially inner face of the thrust plates 42, 42 or the opposite axially outer face of the protruding tubular section of the sleeve 43 and in the radially outer face of the shaft 41 or the opposite radially inner face of the protruding tubular section of the sleeve 43.

The magnetic fluid 52 is filled up to the vicinity of the opening 11 through a reservoir 50 that is formed by the faces: the axially outer face on the upper and lower surface of the protruding tubular section of the sleeve 43, the lower faces of the sleeve 43, permanent magnet 55 and annular cover 44; and, the respective faces of the thrust plate 42 which confront each of those faces above.

In a stationary state of the spindle motor, the two end portions 53, 53 of the magnetic fluid 52 are attracted to the permanent magnet 55 and retained between the annular cover 44 and the thrust plate 42. When the spindle motor rotates, the end portions 53 of the magnetic fluid 52 are balanced by a centrifugal force. Furthermore, because a capillary phenomenon has hardly any affect, the end portions 53 of the magnetic fluid 52 do not move into the radially inner side opening 11 and leaking or splashing of the magnetic fluid 52 from the opening 11 to the outside of the dynamic pressure bearing doesn't occur.

INDUSTRIAL APPLICABILITY

As described in detail hereinabove, the dynamic pressure bearing in accordance with the present invention holds a magnetic fluid by a magnetic field in a stationary state, holds the magnetic fluid mainly with a centrifugal force during rotation, can provide a margin to the preservation capacity of the magnetic fluid used in the dynamic pressure bearing sections, can extend the service life of the dynamic pressure bearing determined by the evaporation of a lubricating oil, which is the medium of the magnetic fluid, and can sufficiently accommodate the volume expansion of the magnetic fluid caused by a temperature increase in the dynamic pressure bearing. Furthermore, the dynamic pressure bearing can prevent the degradation of bearing performance during rotation, can prevent possible leaking and splashing of the magnetic fluid caused by an instability phenomenon of pumping in the dynamic pressure bearing. Such a dynamic pressure bearing can be used for various types of small precision motors for polygonal mirrors, fans, multimedia products such as CD, DVD, MO and optical disks, and fans, for medium-size motors for household appliances, domestic installations, OA devices, units for vehicles, and industrial uses, as well as for machine tools, medical devices, turbines, reels, automobiles, electric trains, ships, aircrafts and other vehicles, and equipment for production of semiconductors, electric and electronic devices, and other apparatuses.

The invention claimed is:

1. A dynamic pressure bearing in which a shaft having a protruding tubular section for inserting into a toric thrust plate and a sleeve is fitted to an outer periphery of said shaft having said toric thrust plate fitted and fixed thereto so as to be rotatable relatively to the shaft, a clearance section for generating a thrust dynamic pressure by an axial inner face of said thrust plate and an opposite axial outer face of the protruding tubular section, a clearance section for generating a radial dynamic pressure by an inner peripheral face of the protruding tubular section of said sleeve and an opposite outer peripheral face of the shaft, and a magnetic fluid is retained and sealed in the clearance sections, wherein
   an annular cover made of a nonmagnetic material is formed on the sleeve outwardly from said thrust plate in an axial direction via a clearance section,
   a radially inward end of said annular cover serves as an opening,
   at least two clearance sections of the clearance section between said thrust plate and said annular cover and a clearance section between a position radially outward from said thrust plate and an opposite position radially inward from the sleeve are used as a reservoir for reserving the magnetic fluid,
   an end portion of the magnetic fluid is kept in the clearance section between said thrust plate and said annular cover, which forms said reservoir, and
   a magnetomotive force member positioned radially outward the end portion of the magnetic fluid and producing concentrated flux lines on magnetic fluid located radially outward from the end portion.

2. The dynamic pressure bearing according to claim 1, wherein an annular step for inhibiting a capillary phenomenon is formed inwardly in a radial direction from an end of the opening of the annular cover, and/or, is formed inwardly in a radial direction from the thrust plate and also outwardly in an axial direction therefrom.

3. A rotating device comprising the dynamic pressure bearing according to claim 1.

4. A dynamic pressure bearing in which a shaft having a protruding tubular section for inserting into a toric seal plate and a sleeve is fitted to an outer periphery of said shaft having said seal plate fitted and fixed thereto so as to be rotatable relatively to the shaft, a clearance section for generating a radial dynamic pressure by an inner peripheral face of the protruding tubular section of said sleeve and the opposite outer peripheral face of the shaft, and a magnetic fluid is retained and sealed in the clearance section, wherein
   an annular cover made of a nonmagnetic material is formed on the sleeve outwardly from said seal plate in an axial direction via a clearance section,
   a radially inward end of said annular cover serves as an opening,
   at least two clearance sections of the clearance section between said seal plate and said annular cover and a clearance section between a position radially outward from said seal plate and an opposite position radially inward from the sleeve form a reservoir for reserving the magnetic fluid, an end portion of the magnetic fluid is kept in the clearance section between said seal plate and said annular cover, which forms said reservoir, and a magnetomotive force member positioned radially outward the end portion of the magnetic fluid and producing concentrated flux lines on magnetic fluid located radially outward from the end portion.

* * * * *